US011036696B2

(12) United States Patent
Higginson et al.

(10) Patent No.: US 11,036,696 B2
(45) Date of Patent: Jun. 15, 2021

(54) RESOURCE ALLOCATION FOR DATABASE PROVISIONING

(71) Applicant: Oracle International Corporation, Redwood Shores, CA (US)

(72) Inventors: Antony Stephen Higginson, Widnes (GB); Michael James Brandt, Edinburgh (GB); James Antony William Cremonini, Aylesbury (GB); Nick Balch, High Wycombe (GB); John Masterson, Navan (IE); Paul Hughes, Ash Urn, VA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 49 days.

(21) Appl. No.: 15/175,213

(22) Filed: Jun. 7, 2016

(65) Prior Publication Data
US 2017/0351716 A1    Dec. 7, 2017

(51) Int. Cl.
*G06F 16/21*    (2019.01)
*G06F 16/28*    (2019.01)
(Continued)

(52) U.S. Cl.
CPC .......... *G06F 16/212* (2019.01); *G06F 9/5061* (2013.01); *G06F 16/214* (2019.01);
(Continued)

(58) Field of Classification Search
CPC .. G06F 17/30598; G06F 16/21; G06F 16/212; G06F 16/214
See application file for complete search history.

(56) References Cited

U.S. PATENT DOCUMENTS

| 6,016,394 A | 1/2000 | Walker |
| 6,185,625 B1 | 2/2001 | Tso et al. |

(Continued)

FOREIGN PATENT DOCUMENTS

| CN | 1545674 | 11/2004 |
| CN | 1734421 | 2/2006 |

(Continued)

OTHER PUBLICATIONS

Chinese Application No. 201480035255.X, Office Action dated Feb. 27, 2017, 11 pages (5 pages for the original document and 6 pages for the English translation).

(Continued)

*Primary Examiner* — Ashish Thomas
*Assistant Examiner* — Jedidiah P Ferrer
(74) *Attorney, Agent, or Firm* — Kilpatrick Townsend & Stockton LLP

(57) ABSTRACT

A method of pre-allocating resources for database provisioning in a private cloud may include determining characteristics of a plurality of databases in a customer's database system. The method may also include grouping the characteristics of the plurality of databases to generate a plurality of database templates that are descriptive of the plurality of databases. The method may additionally include causing resources to be pre-allocated in the private cloud based on at least some of the plurality of database templates. The method may further include receiving a selection of a database template from the plurality of database templates as part of a provisioning request. The method may also include causing a database described at least in part by the database template to be provisioned in the private cloud.

20 Claims, 14 Drawing Sheets

(51) Int. Cl.
  *G06F 9/50* (2006.01)
  *G06F 16/9535* (2019.01)
  *G06Q 10/06* (2012.01)

(52) U.S. Cl.
  CPC ........ *G06F 16/285* (2019.01); *G06F 16/9535* (2019.01); *G06Q 10/06* (2013.01)

(56) References Cited

U.S. PATENT DOCUMENTS

| | | |
|---|---|---|
| 6,477,483 B1 | 11/2002 | Scarlat et al. |
| 6,604,110 B1 | 8/2003 | Savage et al. |
| 6,615,220 B1 | 9/2003 | Austin et al. |
| 6,738,811 B1 | 5/2004 | Liang |
| 6,889,210 B1 | 5/2005 | Vainstein |
| 6,973,489 B1 | 12/2005 | Levy |
| 7,065,541 B2 | 6/2006 | Gupta et al. |
| 7,177,866 B2 | 2/2007 | Holenstein et al. |
| 7,290,003 B1 | 10/2007 | Tong |
| 7,343,467 B2 | 3/2008 | Brown et al. |
| 7,548,898 B1 | 6/2009 | Tarenskeen et al. |
| 7,580,862 B1 | 8/2009 | Montelo et al. |
| 7,620,665 B1 | 11/2009 | George et al. |
| 7,693,983 B1 | 4/2010 | Gupta et al. |
| 7,865,584 B2 | 1/2011 | Grossner et al. |
| 7,886,028 B2 | 2/2011 | Kogoh |
| 7,913,056 B2 | 3/2011 | Brown et al. |
| 8,059,565 B2 | 11/2011 | Dholakia et al. |
| 8,074,107 B2 | 12/2011 | Sivasubramanian et al. |
| 8,150,811 B1 | 4/2012 | Tarenskeen et al. |
| 8,175,863 B1 | 5/2012 | Ostermeyer et al. |
| 8,271,757 B1 | 9/2012 | Chatterjee et al. |
| 8,356,010 B2 | 1/2013 | Driesen |
| 8,584,230 B2 | 11/2013 | Dillaway et al. |
| 8,606,894 B1 | 12/2013 | Fremont et al. |
| 8,639,989 B1 | 1/2014 | Sorenson, III et al. |
| 8,924,353 B1 | 12/2014 | Patwardhan et al. |
| 8,943,032 B1 | 1/2015 | Xu et al. |
| 9,098,364 B2 | 8/2015 | Davis |
| 9,176,773 B2 | 11/2015 | Fries et al. |
| 9,401,904 B1 | 7/2016 | Hankins et al. |
| 9,442,983 B2 | 9/2016 | Higginson et al. |
| 9,479,394 B2* | 10/2016 | Lochhead ............. G06F 9/5077 |
| 9,491,072 B2 | 11/2016 | Raghunathan et al. |
| 9,602,599 B2 | 3/2017 | Bhattacharya et al. |
| 9,626,710 B1 | 4/2017 | Chheda et al. |
| 9,736,013 B2 | 8/2017 | Markley et al. |
| 9,747,311 B2 | 8/2017 | Buehne et al. |
| 9,762,461 B2 | 9/2017 | Raghunathan et al. |
| 9,792,321 B2 | 10/2017 | Buehne et al. |
| 9,805,070 B2 | 10/2017 | Buehne et al. |
| 9,811,527 B1 | 11/2017 | Esposito et al. |
| 9,967,154 B2 | 5/2018 | Masterson et al. |
| 9,996,562 B2 | 6/2018 | Higginson et al. |
| 10,007,701 B2 | 6/2018 | Subramanian et al. |
| 10,198,255 B2 | 2/2019 | Higginson et al. |
| 10,248,671 B2 | 4/2019 | Buehne et al. |
| 10,691,654 B2 | 6/2020 | Higginson et al. |
| 2001/0029502 A1 | 10/2001 | Oeda |
| 2001/0044795 A1* | 11/2001 | Cohen ............. G06F 17/30699 707/999.005 |
| 2002/0002578 A1 | 1/2002 | Yamashita |
| 2002/0019826 A1 | 2/2002 | Tan |
| 2002/0147645 A1 | 10/2002 | Alao et al. |
| 2002/0177977 A1 | 11/2002 | Scarlat et al. |
| 2002/0194329 A1 | 12/2002 | Alling |
| 2002/0198984 A1 | 12/2002 | Goldstein et al. |
| 2003/0037034 A1* | 2/2003 | Daniels ............. G06Q 10/087 707/999.001 |
| 2003/0066049 A1 | 4/2003 | Atwood et al. |
| 2003/0069903 A1 | 4/2003 | Gupta et al. |
| 2003/0192028 A1 | 10/2003 | Gusler et al. |
| 2004/0098425 A1 | 5/2004 | Wiss et al. |
| 2004/0153358 A1 | 8/2004 | Lienhart |
| 2004/0167840 A1 | 8/2004 | Tully et al. |
| 2004/0178261 A1 | 9/2004 | Potonniee et al. |
| 2004/0181790 A1 | 9/2004 | Herrick |
| 2004/0260875 A1 | 12/2004 | Murotani et al. |
| 2005/0021567 A1 | 1/2005 | Holenstein et al. |
| 2005/0055357 A1* | 3/2005 | Campbell ................ G06F 8/61 707/999.1 |
| 2005/0055446 A1 | 3/2005 | Chidambaran et al. |
| 2005/0102318 A1 | 5/2005 | Odhner et al. |
| 2005/0204241 A1 | 9/2005 | Tamakoshi |
| 2006/0059253 A1 | 3/2006 | Goodman et al. |
| 2006/0112247 A1 | 5/2006 | Ramany et al. |
| 2006/0156086 A1 | 7/2006 | Flynn et al. |
| 2006/0173875 A1 | 8/2006 | Stefaniak |
| 2006/0179171 A1 | 8/2006 | Stefaniak et al. |
| 2006/0179431 A1 | 8/2006 | Devanathan et al. |
| 2006/0235899 A1 | 10/2006 | Tucker |
| 2006/0282825 A1 | 12/2006 | Taylor |
| 2007/0028234 A1 | 2/2007 | Sero et al. |
| 2007/0067847 A1 | 3/2007 | Wiemer et al. |
| 2007/0089092 A1 | 4/2007 | Schmidt et al. |
| 2007/0106710 A1 | 5/2007 | Haustein et al. |
| 2007/0150488 A1 | 6/2007 | Barsness et al. |
| 2007/0234346 A1 | 10/2007 | Kramer et al. |
| 2007/0239774 A1 | 10/2007 | Bodily et al. |
| 2007/0250829 A1 | 10/2007 | Hillier et al. |
| 2007/0299892 A1 | 12/2007 | Nakahara |
| 2008/0010233 A1 | 1/2008 | Sack et al. |
| 2008/0148345 A1 | 6/2008 | Rubio |
| 2008/0247320 A1 | 10/2008 | Grah et al. |
| 2008/0313595 A1 | 12/2008 | Boulineau et al. |
| 2009/0012981 A1 | 1/2009 | Kogoh |
| 2009/0048993 A1 | 2/2009 | Lohrbach et al. |
| 2009/0070733 A1 | 3/2009 | Huang et al. |
| 2009/0070771 A1 | 3/2009 | Yuyitung et al. |
| 2009/0113399 A1 | 4/2009 | Tzoref et al. |
| 2009/0126022 A1 | 5/2009 | Sakaki |
| 2009/0157864 A1 | 6/2009 | Kim |
| 2009/0187413 A1 | 7/2009 | Abels et al. |
| 2009/0210857 A1 | 8/2009 | Martineau |
| 2009/0238078 A1 | 9/2009 | Robinson et al. |
| 2009/0276771 A1* | 11/2009 | Nickolov ............ G06F 9/4856 717/177 |
| 2009/0313311 A1 | 12/2009 | Hoffmann et al. |
| 2010/0005097 A1 | 1/2010 | Liang et al. |
| 2010/0049851 A1* | 2/2010 | Garrison ............... G06F 9/5061 707/E17.032 |
| 2010/0049934 A1 | 2/2010 | Tomita et al. |
| 2010/0082543 A1 | 4/2010 | Nagarajan |
| 2010/0191884 A1 | 7/2010 | Holenstein et al. |
| 2010/0192156 A1 | 7/2010 | Hollingsworth |
| 2010/0198799 A1 | 8/2010 | Krishnan et al. |
| 2010/0262974 A1 | 10/2010 | Uyeda |
| 2011/0022711 A1 | 1/2011 | Cohn |
| 2011/0093436 A1 | 4/2011 | Zha et al. |
| 2011/0107327 A1 | 5/2011 | Barkie et al. |
| 2011/0131174 A1* | 6/2011 | Birch ................... G06F 16/22 707/607 |
| 2011/0161933 A1 | 6/2011 | Hudson |
| 2011/0173327 A1 | 7/2011 | Chen et al. |
| 2011/0246526 A1* | 10/2011 | Finkelstein ............ G06F 16/20 707/784 |
| 2011/0251992 A1 | 10/2011 | Bethlehem et al. |
| 2012/0017112 A1 | 1/2012 | Broda et al. |
| 2012/0041933 A1 | 2/2012 | Driesen |
| 2012/0096134 A1 | 4/2012 | Suit |
| 2012/0102498 A1 | 4/2012 | Subramanya et al. |
| 2012/0150642 A1 | 6/2012 | Kandanala et al. |
| 2012/0158821 A1 | 6/2012 | Barros |
| 2012/0221845 A1 | 8/2012 | Ferris |
| 2012/0254435 A1 | 10/2012 | Zhaofu et al. |
| 2012/0265726 A1 | 10/2012 | Padmanabhan et al. |
| 2012/0284360 A1 | 11/2012 | Bense et al. |
| 2012/0297016 A1 | 11/2012 | Iyer et al. |
| 2012/0297059 A1* | 11/2012 | Bross ................ G06F 17/30194 709/224 |
| 2012/0303739 A1 | 11/2012 | Ferris |
| 2012/0311128 A1 | 12/2012 | Pechanec et al. |
| 2013/0067298 A1 | 3/2013 | Li et al. |
| 2013/0085742 A1 | 4/2013 | Barker et al. |

(56) References Cited

U.S. PATENT DOCUMENTS

| | | |
|---|---|---|
| 2013/0085989 A1 | 4/2013 | Nayyar et al. |
| 2013/0086130 A1* | 4/2013 | Wang .............. G06F 17/30067 707/812 |
| 2013/0097651 A1* | 4/2013 | Rendahl .............. G06F 9/45558 726/1 |
| 2013/0152050 A1 | 6/2013 | Chang et al. |
| 2013/0173546 A1 | 7/2013 | Cline et al. |
| 2013/0173547 A1 | 7/2013 | Cline et al. |
| 2013/0211559 A1 | 8/2013 | Lawson et al. |
| 2013/0268643 A1 | 10/2013 | Chang et al. |
| 2013/0268799 A1 | 10/2013 | Mestery et al. |
| 2013/0268800 A1 | 10/2013 | Rangaiah |
| 2013/0283364 A1 | 10/2013 | Chang et al. |
| 2013/0297802 A1 | 11/2013 | Laribi et al. |
| 2013/0311968 A1 | 11/2013 | Sharma |
| 2013/0326028 A1 | 12/2013 | Cox et al. |
| 2013/0339419 A1 | 12/2013 | Emaru |
| 2014/0007216 A1 | 1/2014 | Ahn |
| 2014/0012960 A1 | 1/2014 | Chien |
| 2014/0019212 A1 | 1/2014 | Lieblich |
| 2014/0019961 A1 | 1/2014 | Neuse et al. |
| 2014/0059559 A1 | 2/2014 | Alatorre et al. |
| 2014/0068071 A1 | 3/2014 | Fremont et al. |
| 2014/0075031 A1* | 3/2014 | Doering .............. G06F 17/30575 709/226 |
| 2014/0075033 A1 | 3/2014 | Doering et al. |
| 2014/0089495 A1* | 3/2014 | Akolkar .............. G06F 9/5005 709/224 |
| 2014/0089809 A1 | 3/2014 | Levy et al. |
| 2014/0109053 A1 | 4/2014 | Vasudevan et al. |
| 2014/0129690 A1 | 5/2014 | Jaisinghani et al. |
| 2014/0136711 A1* | 5/2014 | Benari .............. G06F 9/5061 709/226 |
| 2014/0172782 A1 | 6/2014 | Schuenzel et al. |
| 2014/0195636 A1 | 7/2014 | Karve et al. |
| 2014/0215045 A1 | 7/2014 | Wang et al. |
| 2014/0279890 A1 | 9/2014 | Srinivasan et al. |
| 2014/0337429 A1 | 11/2014 | Asenjo et al. |
| 2014/0344439 A1 | 11/2014 | Kempf et al. |
| 2014/0373011 A1 | 12/2014 | Anderson et al. |
| 2015/0019195 A1 | 1/2015 | Davis |
| 2015/0019197 A1 | 1/2015 | Higginson |
| 2015/0019478 A1 | 1/2015 | Buehne et al. |
| 2015/0019479 A1 | 1/2015 | Buehne et al. |
| 2015/0019487 A1 | 1/2015 | Buehne et al. |
| 2015/0019488 A1 | 1/2015 | Higginson et al. |
| 2015/0019564 A1 | 1/2015 | Higginson et al. |
| 2015/0019700 A1 | 1/2015 | Masterson et al. |
| 2015/0019706 A1 | 1/2015 | Raghunathan et al. |
| 2015/0019707 A1 | 1/2015 | Raghunathan et al. |
| 2015/0020059 A1 | 1/2015 | Davis |
| 2015/0026153 A1 | 1/2015 | Gupta et al. |
| 2015/0058467 A1* | 2/2015 | Douglas .............. G06Q 10/0631 709/223 |
| 2015/0096011 A1 | 4/2015 | Watt |
| 2015/0264128 A1 | 9/2015 | Huang et al. |
| 2015/0355947 A1* | 12/2015 | Polkovnikov ......... G06F 3/0631 718/104 |
| 2015/0358392 A1* | 12/2015 | Ramalingam ..... G06F 17/30893 709/203 |
| 2015/0363396 A1 | 12/2015 | Sengupta et al. |
| 2016/0269371 A1 | 9/2016 | Coimbatore |
| 2016/0364229 A1 | 12/2016 | Higginson et al. |
| 2017/0075709 A1* | 3/2017 | Feng .............. G06F 11/3006 |
| 2017/0118244 A1 | 4/2017 | Bai et al. |
| 2017/0278012 A1* | 9/2017 | Prasad .............. G06F 17/30477 |
| 2017/0337193 A1 | 11/2017 | Buehne et al. |
| 2018/0060313 A1 | 3/2018 | Buehne et al. |
| 2018/0157653 A1 | 6/2018 | Wadhwa et al. |
| 2018/0285353 A1 | 10/2018 | Ramohalli Gopala Rao et al. |
| 2018/0293233 A1 | 10/2018 | Higginson et al. |

FOREIGN PATENT DOCUMENTS

| | | |
|---|---|---|
| CN | 1955965 | 5/2007 |
| CN | 101084481 | 12/2007 |
| CN | 101204042 | 6/2008 |
| CN | 101211312 A | 7/2008 |
| CN | 101266606 A | 9/2008 |
| CN | 101322113 | 12/2008 |
| CN | 101473594 | 7/2009 |
| CN | 101739275 A | 6/2010 |
| CN | 101919205 | 12/2010 |
| CN | 103530290 A | 7/2012 |
| CN | 102637143 A | 8/2012 |
| CN | 102662757 | 9/2012 |
| CN | 102982085 A | 10/2012 |
| CN | 103109271 | 5/2013 |
| CN | 103176988 A | 6/2013 |
| CN | 103297492 | 9/2013 |
| CN | 107729252 | 2/2018 |
| CN | 105324756 | 6/2019 |
| CN | 105324769 | 6/2019 |
| CN | 105359146 | 7/2019 |
| CN | 105393250 | 7/2019 |
| CN | 105359147 B | 8/2019 |
| EP | 1611532 | 10/2008 |
| EP | 2418591 | 2/2012 |
| EP | 3019958 | 5/2016 |
| EP | 3019961 | 5/2016 |
| EP | 3019962 | 5/2016 |
| EP | 3019975 | 5/2016 |
| EP | 3019976 | 5/2016 |
| EP | 3019979 | 5/2016 |
| EP | 3019980 | 5/2016 |
| EP | 3019981 | 5/2016 |
| EP | 3020010 | 5/2016 |
| EP | 3019961 | 3/2018 |
| EP | 3019976 | 9/2018 |
| EP | 3418921 | 10/2019 |
| GB | 2468742 | 9/2010 |
| JP | 2006277153 | 10/2006 |
| JP | 2015056182 A | 3/2015 |
| WO | 9952047 | 10/1999 |
| WO | 0153949 | 7/2001 |
| WO | 2010030489 A2 | 3/2010 |
| WO | 2012047757 A1 | 4/2012 |
| WO | 2013072925 A2 | 5/2013 |
| WO | 2015005991 | 1/2015 |
| WO | 2015005994 | 1/2015 |
| WO | 2015006124 | 1/2015 |
| WO | 2015006129 | 1/2015 |
| WO | 2015006132 | 1/2015 |
| WO | 2015006137 | 1/2015 |
| WO | 2015006138 | 1/2015 |
| WO | 2015006308 | 1/2015 |
| WO | 2015006358 | 1/2015 |
| WO | 2015/191119 | 12/2015 |
| WO | 2014032262 A1 | 3/2017 |
| WO | 2017213803 | 12/2017 |

OTHER PUBLICATIONS

European Application No. 14745014.2, Office Action dated Jan. 18, 2017, 8 pages.
A look at Real Application Testing from a customer's perspective, Available Online at: http://www.oracle.com/technetwork/oem/gridcontrol/overview/ratcust-perspectives-white-paper-o-132919.pdf, Jan. 1, 2007.
European Application No. 14745014.2, Office Action dated Apr. 5, 2017, 9 pages.
International Application No. PCT/US2017/032620, International Search Report and Written Opinion dated Jul. 28, 2017, 15 pages.
Chinese Application No. 201480035257.9, Office Action dated Apr. 6, 2017, 10 pages (5 pages for the original document and 5 pages for the English translation).
European Application No. 14745014.2, Notice of Decision to Grant dated Feb. 22, 2018, 2 pages.
Liang et al., Automatic Construction of an Effective Training Set for Prioritizing Static Analysis Warnings, ASE '10 Proceedings of the

(56) References Cited

OTHER PUBLICATIONS

IEEE/ACM international conference on Automated software engineering, Sep. 20-24, 2010, pp. 93-102.
Miller, How to Score Customer Feedback/Bugs and Stores (for Agile), Configuration Management, May 17, 2013.
Chinese Application No. 201480035259.8, Office Action dated Nov. 14, 2017, 17 pages (10 pages for the Original document and 7 pages for the English translation).
Baysal et al., A bug you like: A framework for automated assignment of bugs, Program Comprehension, 2009. ICPC '09. IEEE 17th International Conference, May 17-19, 2009, pp. 297-298.
Chanchary et al., Data Migration: Connecting Databases in the Cloud, ICCIT 2012, Saudi Arabia, retrieved from the Internet: <URL:http://www.chinacloud.cnjupload/2012-03/12033108076850.pdf>, Jun. 28, 2012, pp. 450-455.
Charles, Bug Severity vs. Priority, Quality Intelligence Blog, Retrieved on Aug. 4, 2014, from http://quality-intelligence.blogspot.com/2010/08/bug-severity-vs-priority.html, Aug. 22, 2010, 6 pages.
Das et al., Albatross: Lightweight elasticity in shared storage databases for the cloud using live data migration, 37th International Conference on Very Large Data Bases, Proceedings of the VLDB Endowment, vol. 4, No. 8, Retrieved from the Internet:URL:http://www.cs.ucsb.eduj-sudiptojpapers/albatross.pdf, Aug. 29, 2011, 12 pages.
Leite et al., Migratool: Towards a Web-Based Spatial Database Migration Tool, IEEE Computer Society, Proceedings of the 16th International Workshop on Database and Expert Systems Applications, Aug. 22, 2005, pp. 480-484.
Tao et al., Intelligent database placement in cloud environment, Web Services (ICWS), 2012 IEEE 19$^{th}$ International Conference, IEEE Computer Society, Jun. 24, 2012, pp. 544-551.
To, et al., Best Practices for Database Consolidation on Exadata Database Machine, Oracle, Oracle White Paper, 2011, 29 pages.
Vengurlekar, et al., Best Practices for Database Consolidation in Private Clouds, Oracle, Oracle White Paper, Mar. 2012, 20 pages.
International Application No. PCT/US2014/040486, International Preliminary Report on Patentability dated Oct. 1, 2015, 18/20 pages.
International Application No. PCT/US2014/040486, International Search Report and Written Opinion dated Sep. 29, 2014, 11 pages.
International Application No. PCT/US2014/040486, Written Opinion dated Jun. 17, 2015, 7 pages.
International Application No. PCT/US2014/040692, International Preliminary Report on Patentability dated Oct. 8, 2015, 27/29 pages.
International Application No. PCT/US2014/040692, International Search Report and Written Opinion dated Oct. 8, 2014, 8 pages.
International Application No. PCT/US2014/040692, Written Opinion dated Jul. 16, 2015, 7 pages.
International Application No. PCT/US2014/045226, International Preliminary Report on Patentability dated Jan. 21, 2016, 8 pages.
International Application No. PCT/US2014/045226, International Search Report and Written Opinion dated Oct. 30, 2014, 10 pages.
International Application No. PCT/US2014/045240, International Preliminary Report on Patentability dated Jan. 21, 2016, 8 pages.
International Application No. PCT/US2014/045240, International Search Report and Written Opinion dated Oct. 21, 2014, 10 pages.
International Application No. PCT/US2014/045247, International Preliminary Report on Patentability dated Jan. 21, 2016, 6 pages.
International Application No. PCT/US2014/045247, International Search Report and Written Opinion dated Sep. 3, 2014, 8 pages.
International Application No. PCT/US2014/045282, International Preliminary Report on Patentability dated Jan. 21, 2016, 9 pages.
International Application No. PCT/US2014/045282, International Search Report and Written Opinion dated Sep. 18, 2014, 12 pages, +112 pages of additional references.
International Application No. PCT/US2014/045289, International Preliminary Report on Patentability dated Jan. 21, 2016, 7 pages.
International Application No. PCT/US2014/045289, International Search Report and Written Opinion dated Oct. 15, 2014, 9 pages.
International Application No. PCT/US2014/045721, International Preliminary Report on Patentability dated Jan. 21, 2016, 8 pages.
International Application No. PCT/US2014/045721, International Search Report and Written Opinion dated Nov. 4, 2014, 12 pages.
International Application No. PCT/US2014/045804, International Preliminary Report on Patentability dated Jan. 21, 2016, 8 pages.
International Application No. PCT/US2014/045804, International Search Report and Written Opinion dated Nov. 17, 2014, 12 pages.
U.S. Appl. No. 15/789,049 received a Final Office Action dated Sep. 6, 2018, all pages.
U.S. Appl. No. 15/250,522 received a Corrected Notice of Allowability, dated Sep. 27, 2018, 2 pages.
European Application No. 14744404.6, Office Action dated Oct. 15, 2018, 5 pages.
European Application No. 14745029.0 received an Office Action dated Sep. 18, 2018, 8 pages.
European Application No. 18187354.8 received an Extended European Search Report dated Sep. 12, 2018, 6 pages.
EP14745015.9 received an Office Action dated May 14, 2018, 5 pages.
EP14745013.4 received an Office Action dated Apr. 30, 2018. 6 pages.
CN201480035259.8 received an Office Action dated Jun. 14, 2018, 19 pages.
CN201480039080 X received an Office Action dated Jul. 5, 2018, 19 pages.
CN201480035250.7 received an Office Action dated Jul. 5, 2018, 12 pages.
CN201480039083.3 received an Office Action dated Jul. 5, 2018, 30 pages.
U.S. Appl. No. 13/937,885, Non-Final Office Action dated Aug. 10, 2018, 23 pages.
U.S. Appl. No. 13/938,061, Non-Final Office Action dated Aug. 8, 2018, 30 pages.
U.S. Appl. No. 15/250,522, Notice of Allowance dated Aug. 14, 2018, 10 pages.
Buyukozkan et al., Group Decision Making to Better Respond Customer Needs in Software Development, Computer & Industrial Engineering, vol. 48, Issue 2, Mar. 2005, pp. 427-441.
Laplante et al., Pavlov's Bugs Matching Repair Policies with Rewards, IEEE, vol. 11, Issue 4, Jul.-Aug. 2009, pp. 45-51.
Sharma et al., Predicting the Priority of a Reported Bug Using Machine Learning Techniques and Cross Project Validation, IEEE, 12th International Conference on Intelligent Systems Design and Applications, Nov. 2012, pp. 539-545.
Chinese Application No. 201480039073.X, Office Action dated Jul. 17, 2018, (12 pages of original document and 14 pages of English translation).
Chinese Application No. 201480035349.7 received an Office Action dated Aug. 3, 2018, 14 pages.
Chinese Application No. 201480039070.6 received an Office Action dated Aug. 6, 2018, 21 pages.
European Application No. EP14736122.4 received a Notice of Decision to Grant, dated Aug. 17, 2018, 2 pages.
U.S. Appl. No. 13/937,885, Final Office Action dated Mar. 21, 2019, 23 pages.
U.S. Appl. No. 13/938,061, Final Office Action dated Mar. 8, 2019, 25 pages.
U.S. Appl. No. 15/250,522, Corrected Notice of Allowability dated Jan. 11, 2019, 3 pages.
European Application No. 14745012.6, Office Action dated Mar. 5, 2019, 4 pages.
European Application No. 14745028.2, Office Action dated Feb. 13, 2019, 6 pages.
Chinese Application No. 201480035349.7, Office Action dated Apr. 10, 2019, 7 pages (3 pages of Original Document and 4 pages of English Translation).
Chinese Application No. 201480039070.6, Office Action dated Mar. 26, 2019, 21 pages (9 pages of Original Document and 12 pages of English Translation).
CN201480035259.8, Office Action dated Dec. 3, 2018, 15 pages.
CN201480039073.X, Office Action dated Dec. 10, 2018, 6 pages.
CN201480039083.3, Office Action dated Dec. 10, 2018, 6 pages.
EP14745029.0, Office Action dated Sep. 18, 2018, all pages.

(56) References Cited

OTHER PUBLICATIONS

PCT/US2017/032620, International Preliminary Report on Patentability dated Dec. 20, 2018, 10 pages.
U.S. Appl. No. 15/670,473, Non-Final Office Action dated Dec. 18, 2018, 12 pages.
U.S. Appl. No. 15/789,049, Notice of Allowance dated Nov. 15, 2018, 5 pages.
CN Patent Application No. CN201480039070.6, Office Action dated Jul. 31, 2019, 20 pages.
U.S. Appl. No. 13/937,885, Advisory Action dated Jul. 31, 2019, 17 pages.
U.S. Appl. No. 13/938,061, Advisory Action dated May 24, 2019, 16 pages.
U.S. Appl. No. 15/670,473, Final Office Action dated Jun. 6, 2019, 12 pages.
European Application No. 14745029.0, Summons to Attend Oral Proceedings mailed on Apr. 25, 2019, 12 pages.
Chinese Application No. 201480035349.7, Office Action dated Sep. 4, 2019, 8 pages (3 pages of Original Document and 5 pages of English Translation).
U.S. Appl. No. 15/670,473, Notice of Allowance dated Sep. 18, 2019, 8 pages.
U.S. Appl. No. 16/003,557, Non-Final Office Action dated Sep. 5, 2019, 9 pages.
U.S. Appl. No. 13/937,885, Non-Final Office Action dated Jul. 29, 2020, 24 pages.
Qiu-Yan, et al., "Common Vulnerability Rating Method", Computer Engineering, vol. 34, Issue 19, pp. 133-136, Oct. 2008, English Abstract Submitted.
China Application No. CN201480039070.6 received an Office Action dated Jul. 1, 2020, 14 pages, 11 pages English translation, 3 pages, Chinese Office Action.
China Application No. CN201711101256.1 received an Office Action dated Jun. 3, 2020, 23 pages. 14 pages English translation, 9 pages, Chinese Office Action.
Asabuki; Taku, Part 4 New Classification of Cloud Service, "IaaS" and "PaaS" are not enough, Further segmentation is appropriate, Nikkei Systems, Feb. 2015 issue, Japan, Nikkei Business Publications, Inc., Jan. 26, 2015, vol. 262, pp. 34-39 (5 pages partial English Translation, 9 pages Original Document).
Pernul, et al., The Entity-Relationship Model for Multilevel Security, In International Conference on Conceptual Modeling, Springer, Dec. 1993, 12 pages.
Siegel, et al.., Building Flexible, Extensible Tools for Metadatabase Integration, MIT Libraries, WP # 3357-91-MSA, WP#, CIS-91-11, 22 pages. Nov. 1991.
Ueda; Yukio, Forefront of Technology Utilization, PaaS "Oracle Cloud Platform" Uses DB/AP Server as Weapons, Nikkei Systems, Oct. 2015 issue, Japan, Nikkei Business Publications, Inc., Sep. 26, 2015, vol. 270, pp. 50-55 (4 pages partial English Translation, 9 pages Original Document).
Japan Application No. 2018-563858 received an Office Action dated Jan. 19, 2021, 11 pages (6 pages English Translation, 5 pages Original Office Action).
European Application No. 17 726 0264.3-1222 received a Summons to attend Oral Proceedings Pursuant to Rule 115(1) EPC mailed Jan. 27, 2021, 12 pages.
Chinese Application No. 2017111012561 received a Second Office Action dated Dec. 28, 2020, 18 pages (10 pages English Translation, 8 pages Original Office Action).
U.S. Appl. No. 13/937,885 received a final Office Action dated Feb. 4, 2021, 24 pages.

\* cited by examiner

RESOURCE ALLOCATION FOR DATABASE PROVISIONING

BACKGROUND

Cloud computing allows for the sharing of resources that are accessed via a network or the Internet with the ultimate goal of achieving greater efficiencies that could otherwise be realized using dedicated hardware/software. Specifically, efficiencies can be realized in a number of specific areas that allow organizations to keep their computing resources flexible while achieving business objectives. The level of effort, or time it takes to "provision" a database, in terms of time, cost, and/or or man-hours represents one area of optimization. This level of effort can typically be categorized into two main areas of operations, namely (1) software, representing database software installed on physical machines it is used to run or house the databases, and (2) database instances, representing the physical databases and associated memory structures that are used to house, maintain, and run the customer date. The provisioning of these two areas rapidly, safely, and correctly in private, public, or hybrid clouds is paramount to ensuing an organizations goal of achieving efficiencies and economies of scale. How organisations are able to quantify and qualify these new architectures is difficult in terms of gathering the data, expensive in terms of effort to perform the tasks, and laborious in terms of the amount of time to analyse and culminate a decision. The whole process often results in "Paralysis by Analysis" when these exercises are undertaken.

BRIEF SUMMARY

In some embodiments, a method of pre-allocating resources for database provisioning in a private cloud may include determining characteristics of a plurality of databases in a customer's database system. The method may also include grouping the characteristics of the plurality of databases to generate a plurality of database templates that are descriptive of the plurality of databases. The method may additionally include causing resources to be pre-allocated in the private cloud based on at least some of the plurality of database templates. The method may further include receiving a selection of a database template from the plurality of database templates as part of a provisioning request. The method may also include causing a database described at least in part by the database template to be provisioned in the private cloud.

In some embodiments, a non-transitory, computer-readable medium may include instructions that, when executed by one or more processors, cause the one or more processors to perform operations including grouping the characteristics of the plurality of databases to generate a plurality of database templates that are descriptive of the plurality of databases. The operations may additionally include causing resources to be pre-allocated in the private cloud based on at least some of the plurality of database templates. The operations may further include receiving a selection of a database template from the plurality of database templates as part of a provisioning request. The operations may also include causing a database described at least in part by the database template to be provisioned in the private cloud.

In some embodiments, a system may include one or more processors and one or more memory devices including instructions that, when executed by the one or more processors, cause the one or more processors to perform operations including grouping the characteristics of the plurality of databases to generate a plurality of database templates that are descriptive of the plurality of databases. The operations may additionally include causing resources to be pre-allocated in the private cloud based on at least some of the plurality of database templates. The operations may further include receiving a selection of a database template from the plurality of database templates as part of a provisioning request. The operations may also include causing a database described at least in part by the database template to be provisioned in the private cloud.

In any of the embodiments described herein, one or more of the following features may be included in any combination and without limitation. The characteristics of the plurality of databases may include an operating system type and version. The characteristics of the plurality of databases may include a database type and version. The characteristics of the plurality of databases may include a database memory size. The characteristics of the plurality of databases may include a processor usage. The characteristics of the plurality of databases may be determined by one or more software agents installed on the customer's database system that transmit the characteristics through a gateway to a cloud support platform. The cloud support platform may generate real-time reports of the characteristics of the plurality of databases. The method/operations may also include dividing the characteristics into at least a first group of characteristics and a second group of characteristics. The first group of characteristics may include characteristics that are shared between two or more of the plurality of databases, and the second group of characteristics may include characteristics that are unique to at least one of the two or more of the plurality of databases. The first group of characteristics may include an operating system, a database version number, and a database type. The second group of characteristics may include a database memory size, a listener port, and a home directory path. The method/operations may also include creating, after receiving the selection of the database template, a transient template that includes the first group of characteristics from the database template, receiving input comprising values for the second group of characteristics, and assigning the values for the second group of characteristics to the transient template. The method/operations may also include maintaining the transient template in a library of templates while the database described at least in part by the database template is active in the private cloud, deleting the transient template from the library of templates after the database described at least in part by the database template is no longer active in the private cloud, and/or querying, by a cloud support platform, the private cloud to determine when the database described at least in part by the database template is no longer active in the private cloud. The method/operations may also include receiving an additional selection of an additional database template from the plurality of database templates as part of the provisioning request, receiving input indicating that the database described at least in part by the database template and an additional database described at least in part by the additional database template should be provisioned together as part of the provisioning request, and causing the additional database described at least in part by the additional database template to be provisioned in the private cloud with the database described at least in part by the database template. The private cloud may include a first Platform as a Service (PaaS) pool using a first operating system and a second PaaS pool using a second operating system, where the first operating system may be different from the second operating system. The first PaaS pool may include a first Database as a Service (DBaaS) pool using a first database version and a second DBaaS pool using a second database version, where the first database version may be different from the second database version. The method/operations may also include testing the private cloud to determine whether the database described at least in part by the database template can be installed in a DBaaS pool that matches specifications in the database template. Testing the private cloud may include determining whether the private cloud includes a DBaaS pool with an operating system, database version, and database type that matches the database template, and whether the private cloud has sufficient memory and processing power to accommodate the database described at least in part by the database template.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein, are embodiments for pre-allocating resources for database provisioning in a private cloud. A customer database system may include databases and servers configured by the customer. A gateway can link the customer database system to a cloud support platform, which can then analyze the customer database system in the background as the database system runs. The cloud support platform can monitor usage statistics and analyze the database system in order to determine characteristics that describe each of the individual databases in the system. The characteristics of the database systems can be grouped together to form templates that generally describe classes of databases that are instantiated on the customer database system. The cloud support platform can then pre-allocate resources to ensure that a private cloud has the hardware and software resources available should a request be received to provision a database in the private cloud that is similar to an existing database in the customer database system. When a customer wants to provision a new database in the private cloud, an interface presents the customer with a library of database templates. The customer can select the database template and customize various adjustable parameters, and make a provisioning request. Because the private cloud was previously tested to ensure compatibility with the selected template, and because the private cloud resources were preallocated, the provisioning request can be completed in a matter of minutes, rather than weeks or months.

A library of catalogues may represent available databases that may be provisioned in a private cloud. The library is a link between the technical specification of each of the databases mapped against the business requirements of an organization. For example, a gold level database could be a highly configured database residing in a highly configured cloud. The catalogue can be made up of database templates that determine the general configuration of databases in terms of software version, database type, database size, database configuration, backup configuration, and so forth. To help reduce the number of these catalogues that are stored in a library, each of the catalogues can be considered "transient," in that the parameters of the catalogue can be changed dynamically, which reduces interaction between users and support teams and ensures that the correct database is provisioned in the correct cloud.

Figure 1:
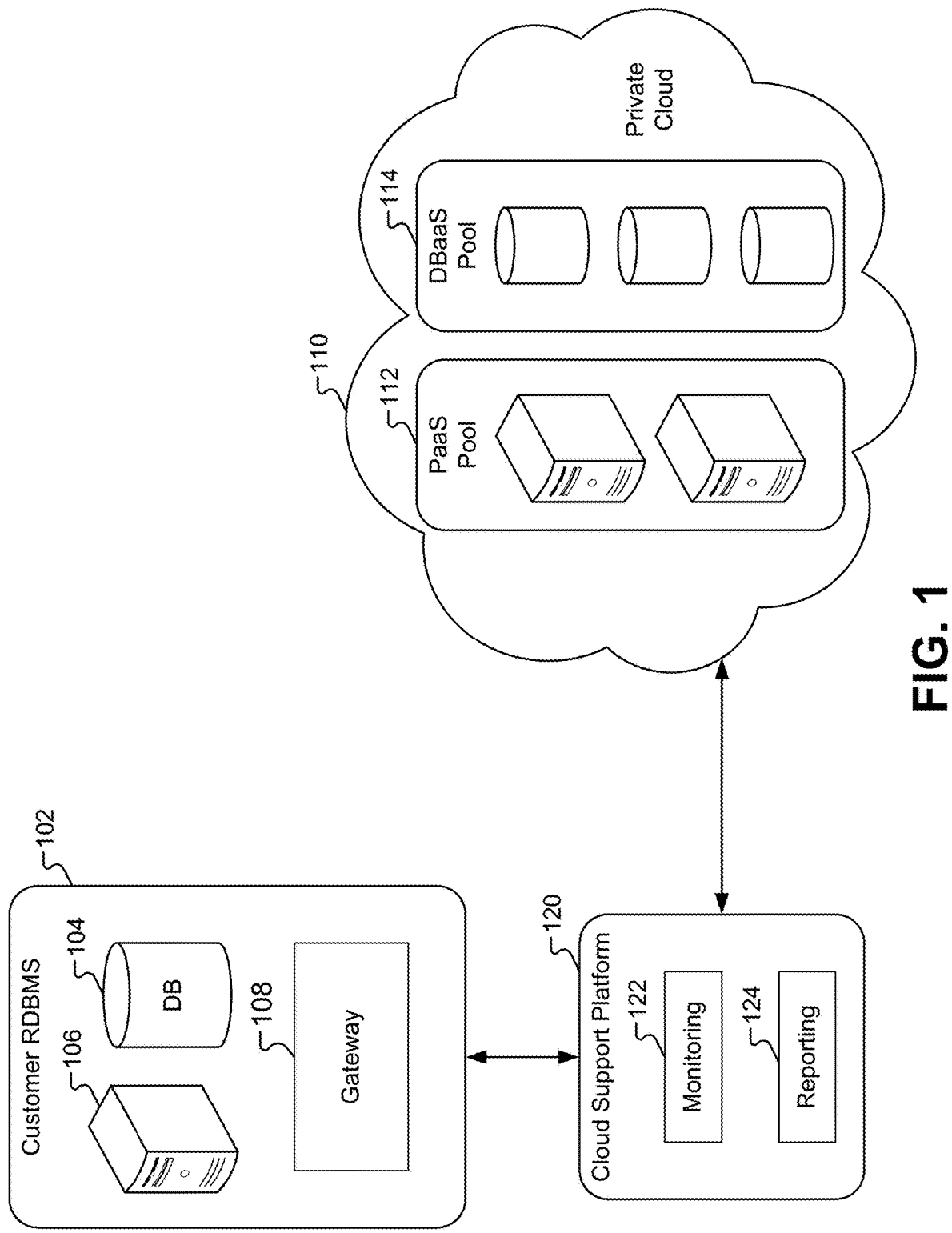
FIG. 1 illustrates a simplified system diagram of a customer database system, a cloud support platform, and a private cloud, according to some embodiments.

FIG. 1 illustrates a simplified system diagram of a customer database system, a cloud support platform, and a private cloud, according to some embodiments. The customer database system 102 may include one or more databases 104 and one or more servers 106. The customer database system 102 may also include a relational database management system (RDBMS) that governs access to data stored in the databases 104. The customer database system 102 may physically reside on a customer worksite, or may alternatively be distributed across a number of different worksites associated with the customer.

In some embodiments, the customer may subscribe to a cloud support platform 120 provided by a database provider. For example, the cloud support platform 120 may include the Oracle Advanced Support Portal® offered by Oracle®. The cloud support platform 120 can install a gateway 108 on the customer database system 102 that monitors and analyzes the customer database system 102. The gateway 108 can analyze usage statistics, log histories, and perform an analysis of each of the databases 104 to determine the hardware/software requirements of the customer database system 102, as well as the estimated capacity needs. The customer is able to log into the cloud support platform 120 to access these reports and statistics and monitor the performance of the customer database system 102.

Specifically, the cloud support platform 120 can identify the physical machines that house the databases 104 and determines characteristics each of the databases 104. These characteristics may include a physical memory size requirement of each of the databases 104, operating systems used by each of the databases, software versions of each of the databases 104, speed/processing requirements of each of the databases 104, configurations of each of the databases 104, and so forth. The gateway 108 may also identify features of the databases 104, such as security requirements, latency requirements, availability requirements, data protection and backup requirements, and so forth. As will be described in greater detail below, these characteristics of the customer database system 102 are used by the cloud support platform 120 to generate a plurality of database templates the functioning describe the hardware/software requirements of each of the databases 104 of the customer database system 102.

The cloud support platform 110 can be communicatively coupled to a private cloud 110. The private cloud 110 may include a Platform as a Service (PaaS) pool 112 of resources based on common operating systems. For example, the PaaS pool 112 may include a group based on the Linux operating system and a group based on the Solaris operating system. The private cloud 110 may also include a Database as a Service (DBaaS) pool 114 grouping of resources based on the version and type of each database. For example, the DBaaS pool 114 may include groupings of databases based on database versions, single-instance versus multiple-instance designs, container databases versus pluggable databases, and so forth.

Generally, when a customer decides to provision a new database in the private cloud 110, the requirements for the newly provisioned database will be very similar to a database that already exists in the databases 104 of the customer database system 102. For example, a customer may wish to upgrade an existing database, add features to an existing database, backup and existing database, or design a new database to replace an existing database. In each of these operations, the database to be provisioned in the private cloud 110 may be very similar to at least one of the existing databases 104 in the customer database system 102. By analyzing the existing databases 104, the gateway 108 and/or cloud support platform 120 can effectively predict the types of databases the customer will request to be provisioned in the private cloud 110 in the future. Knowing this information, the cloud support platform 120 can test the private cloud 110 to ensure that it is compatible with databases commonly found in the customer database system 102. The cloud support platform 120 can also preallocate hardware/software resources in the private cloud 110 so that the private cloud 110 is ready when such requests are received from the customer database system 102. These operations create a private cloud 110 that is optimized to serve the needs of the customer. Prior to this disclosure, when a customer wished to provision a new database in a private cloud 110, the process of allocating hardware/software resources and ensuring that the proper operating systems a database versions were installed in the private cloud 110 was a process that took weeks, or even months. By preallocating and testing the private cloud 110 as the customer database system 102 is analyzed by the gateway 108 and/or the cloud support platform 120, the provisioning process for a new database based on a selected template derived from an existing database of the customer database system 102 can be completed in a matter of minutes.

Figure 2:
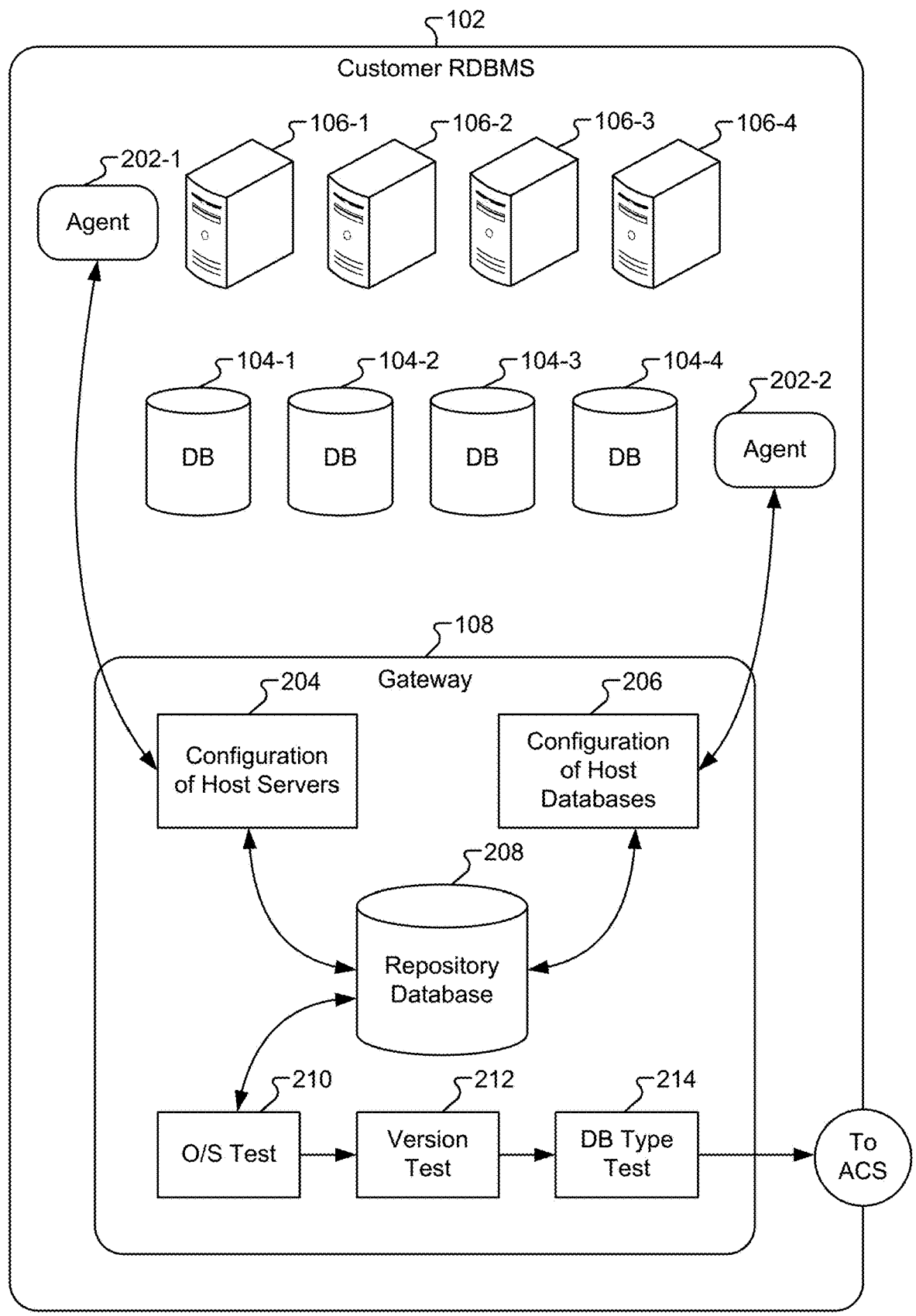
FIG. 2 illustrates a simplified diagram of the customer database system with an installed gateway, according to some embodiments.

FIG. 2 illustrates a simplified diagram of the customer database system 102 with an installed gateway 108, according to some embodiments. The customer database system 102 may comprise databases 104 of different configurations (e.g., RAC, PDB, Single Instance, etc.) and of varying versions (e.g., 10g, 11g, 12c) that are installed on servers 106 of varying operating system types and versions. These hosts can be virtual machines and/or physical machines. In some instances, hosts may not have any software or databases installed and configured, and may just be idle awaiting allocation.

The gateway 108 of the cloud support platform 120 can be installed on the customer database system 102. A customer administrator may either locally or remotely accesses the services and tooling provided by the cloud support platform 120. In one example, the cloud support platform and/or gateway may have installed a full copy of Oracle's EM12C® software suite, including cloud plugins and database provisioning service logic code. Configuration and performance data for the customer database system 102 can be captured by host various agents 202 installed at the customer database system 102. These agents 202 can detect characteristics, such as an operating system, memory, storage, CPU usage, and bandwidth usage. The agents 202, or EM12C plugins, may then report back to processes 204, 206 that monitor the host servers and host databases. The database/server characteristics may be stored in a repository 208.

Turning back briefly to FIG. 1, the private cloud 110 is a combination of several logical groupings. The first logical grouping is the PaaS zone 112, which is a collection of allocated hosts. The second logical grouping is the DBaaS zone 114, which is a pool of resources in which databases can be created and utilized. These logical groupings can be created and stored using plugins provided through the cloud support platform 120.

After analyzing the customer database system 102 and generating database templates, a representation of the templates can be presented to the customer to provide an overview of their database system, along with any existing systems in the private cloud 110 and the configuration and current usage within the private cloud 110 and/or the customer database system 102. Potential hosts that are ready to be allocated to the private cloud 110 may also be displayed to the customer to give an overview of how the customer can manipulate the private cloud 110 to be elastic (i.e., to grow or shrink).

Potential hosts in the private cloud 110 could be a mix of operating systems such as Linux, AIX, Solaris, Windows, etc. Turning back to FIG. 2, a test can be performed using database provisioning service logic code in the gateway 108 to test the operating system type 210 to ensure that all hosts in a PaaS pool 112 are of the same type. For example all hosts in waiting to be allocated could use the Linux and Solaris operating system, and yet the PaaS pool 112 could be comprised of only Linux. The data displayed to the customer may include the results from the test of the system type 210 to ensure that the correct host is assigned to the correct corresponding PaaS pool 112. In this example, the Linux host may be displayed, but the Solaris host would not be displayed. This test ensures that no mistake or potential misconfiguration of the DBaaS pool 114 will take place, which speeds up the cloud provisioning processes and reduces the level of effort and expertise needed to create, maintain, and amend DBaaS clouds.

Data can be presented to the customer to give an overview of the database software installed on the PaaS pool 112, along with the configuration and current usage within the DBaaS pools 114. The software determines the database type for each pool. For example a database pool must be of the same version as a database being provisioned, e.g., a version 12c Oracle® database could not reside on a DBaaS Pool if that pool did not have version 12c software running thereon.

When the customer requests provisioning a new database, they will select a template from a library of templates. Each template may include information on the source configuration of an existing database in the customer database system 102. A test 212 can be performed to ensure that the proper software version is installed on the PaaS pool 112. (This may be necessary because the target database type may be assigned to individual DBaaS Pools.) For example, a Real Application Clusters (RAC) database must have Oracle's Cluster Ready Services (CRS) software installed to be able to run correctly, whereas a single instance database does not require any such additional software. The software version test 212 can ensure that the customer is only able to deploy a particular database into the correct DBaaS pool 114.

The customer may also request a database configuration with a specific size (e.g., memory, storage, and CPU requirements). The DBaaS Pool 114 may also be created to be the correct size to house the configuration that is requested. For example, the DBaaS pool 114 should be greater than the size requested to ensure the new database will fit in the preallocated resources of the private cloud 110. Finally, a database type test 214 can be carried out by the gateway 108 to ensure that the customer can request the correct size of database for the templates derived from the customer database system 102.

Once all the tests 210, 212, 214 have been performed on the requested template for a newly provisioned database in the private cloud 110, the cloud support platform 120 can operate through various APIs to actually provision the new database in the private cloud 110. In order to provide an enabling disclosure, a process for provisioning a database through the APIs of the Oracle Enterprise Manager (EM) is included below. However, in light of this disclosure, one having skill in the art could modify these specific procedures to be performed on other APIs for other systems that interface with the private cloud 110. Therefore, the following description is merely exemplary, and not meant to be limiting.

In this specific example, all of the provisioning, whether it is zones, pools, the library, transient templates or the database itself may be accomplished through two Enterprise Manager APIs, namely, the Enterprise Manager Command Line Interface (EMCLI) API, and the Representational State Transfer (REST) API. The EMCLI API is a simple procedural call that is executed in a single command line. The command line may include a verb (i.e., "what we are trying to do") and a set of parameters to support that verb. EMCLI verbs can be run in real time or through the Enterprise Manager scheduler. The REST API comprises a general HTTP protocol used to aid in the development of web services. In essence, it involves an action—such as a POST or GET command—and a payload file containing parameter-value pairs. POSTing a payload to a Uniform Resource Identifier (URI) will send the payload to, for example, a webpage, which is presumed to know how to handle payload. To retrieve the state of an action, a GET call can be sent to the same URI, and a payload will be received which, when parsed, enables information of that state to be passed back through the code.

When a customer requests a new database to be provisioned, a PL/SQL procedure can take all of the parameters for the new database and generate a parameter file. That parameter file may include a simple PARAMETER'='VALUE' text file. In some embodiments, the process of provisioning a database must first create a transient template (described in greater detail below). The PL/SQL procedure can make an operating system call to code which takes an action and a pointer to the parameter file. The create template process uses the EMCLI API, which reads the parameter file, generates the EMCLI command line for the action, and then runs the action. As this is a real-time execution (rather than an action run through the scheduler), the output is passed from the EMCLI call, and then an interrogation can be made to confirm that the action succeeded.

Next, another parameter file can be constructed that includes information such as a database name, a template name, and so forth. A call can then be made to the OS code to provision the database. The OS code can take the parameter file, convert it into a payload for the REST API—typically in a JavaScript Object Notation (JSON) format file—then post it to the URI for the PaaS zone. The Enterprise Manager scheduler runs in the background to execute GET calls to the URI for the provisioning process after it is submitted. By executing GET commands every few seconds, the customer can see the current state of the provisioning process. Specifically, the returned payload can be parsed, and the status can be extracted from the resulting payload. In order to pass this information back to the PL/SQL code, a table can be utilized in the database repository 208 that acts as a log for each individual action (i.e., "Create_Zone," "Create_Database," etc.). Every time a GET call is made, the log table in the database can be updated with pertinent information from a returned payload. The log table can then be probed to retrieve the current status (e.g., "Running," "Completed," etc.) to be displayed on the user interface for the customer. (See the discussion for FIG. 7 below.) This same log table can also be used to hold other information extracted from the payload that is useful for the customer. For example, a connect string for the database can be stored so that the customer can log into the database after it is provisioned. Should the job fail for any reason, the reason for failure can also be extracted from the GET payload and stored in the log table. The fact that the EM scheduler runs as a job in the background with a unique URI means that several provisioning processes can be run in parallel to facilitate bulk provisioning, which will be discussed in greater detail below. Should the customer wish to remove the provisioned database, the database itself also has a URI. The customer can make a simple REST DELETE call to that URI, then monitor that job in the same manner as described above for provisioning the database until the deletion is completed.

Figure 3:
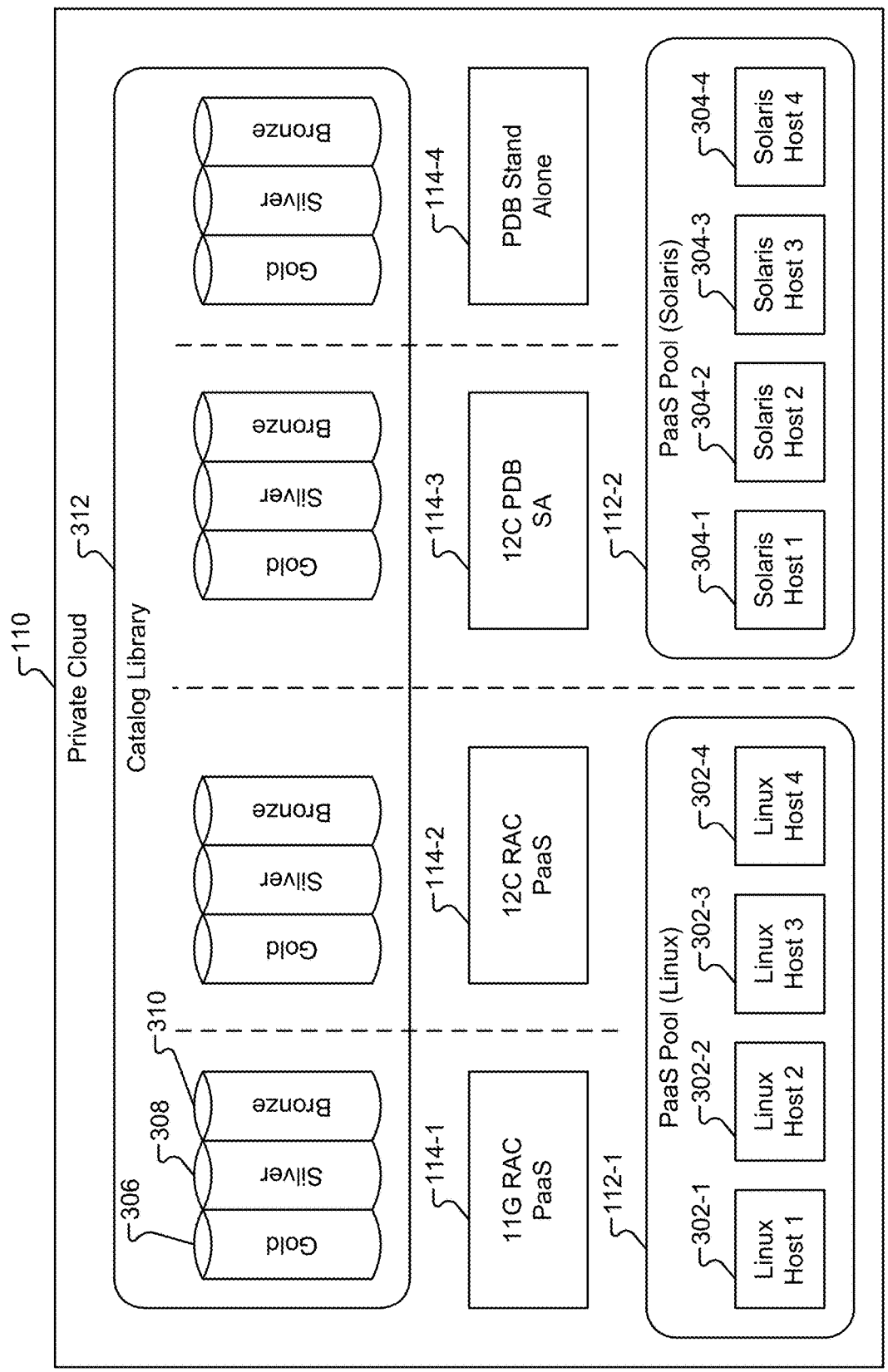
FIG. 3 illustrates different template offerings that may be provided in the private cloud, according to some embodiments.

FIG. 3 illustrates different template offerings that may be provided in the private cloud, according to some embodiments. After analyzing the customer database system 102, the characteristics for each database 104 can be compared and grouped together to form templates. A single template may be descriptive of one or more of the databases 104 in the customer database system 102. In some embodiments, databases having similar physical structures or applications can be grouped together into a group, and different levels can be created for that group. For example, a financial database can be analyzed and a template can be generated from that financial database.

Next, a plurality of levels can be created, each having its own template. Merely for exemplary purposes, the levels described herein will be labeled Gold, Silver, Bronze, and so forth, to specify different database levels. For example, a gold level database may be a very complicated database, such as a RAC database, configured with advanced security features within the private cloud 110. It may require special attention to backups and/or recovery. In comparison, a silver-level database may adhere to a lesser standard and not require as much configuration or as many resources. In some embodiments, a gold level database may correspond to a live system for use with customers, requiring high levels of availability, specific security protocols, and high fidelity backup routines. A silver level database may correspond to a database testing environment before database systems go live. A bronze level database may correspond to a prototyping database environment, where new database ideas can be tested during the development phase.

In general, databases can be assigned to different levels based on a plurality of different factors. One factor may be availability, which describes how and when backup and recovery strategies are employed, whether the database will have RAC capabilities, and whether it will require a maximum availability architecture via a standby database. Another factor may be security, which may include a specific security product, such as Data Vault®, or data masking, a designation of whether the database is for testing or development, whether certain users are allowed access, or whether generic passwords are allowed. Another factor may include performance, including whether certain levels will have more capacity in terms of memory, CPU power, and/or storage, and a designation as to how outages are handled. Another factor may include cost in terms of maintenance and customer service. Another factor may include agility, which may ensure that projects fully utilize available resources through a queuing ontology that forces projects/systems to be as efficient as possible and reduce resource waste. Each of these factors may be assigned a value for each level in the template library.

In the example of FIG. 3, each database in the DBaaS pools 114 includes a gold level 306, a silver level 308, and a bronze level 310. For example, a Linux host 302 may run a version 11G RAC database at a gold level 306, a silver level 308, and/or a bronze level 310. Similarly, a Solaris host 304 may run a version 12C PDB database at the same levels.

Figure 4:
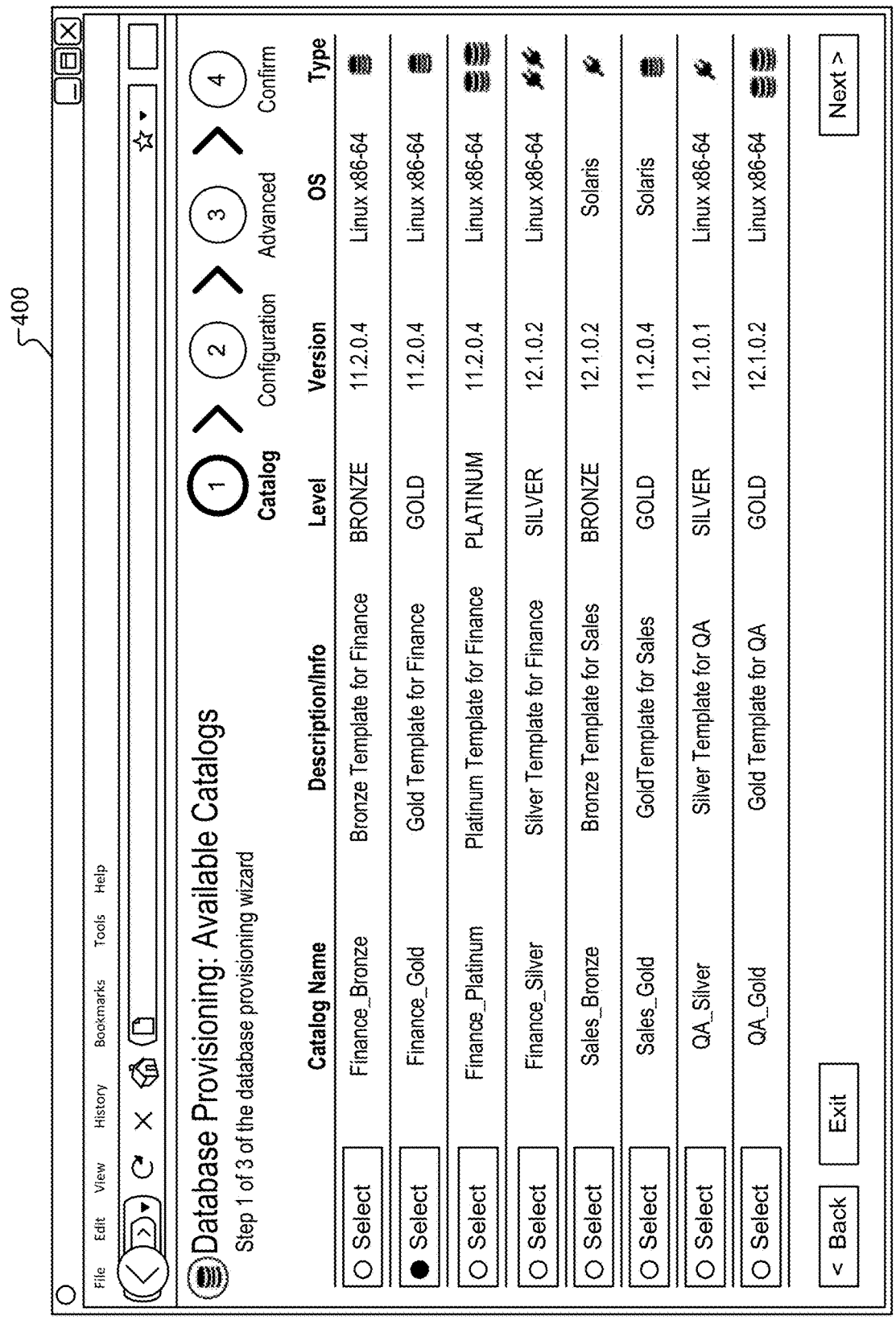
FIG. 4 illustrates a user interface for selecting a database type and level, according to some embodiments.

FIG. 4 illustrates a user interface 400 for selecting a database type and level, according to some embodiments. As an example, this particular customer may be operating a business having a finance database, a sales database, and a quality assurance (QA) database. As described above, the gateway installed on the customer database system would analyze each of these databases, determine characteristics for each of these databases, and generate templates for each of these databases. Then, corresponding to each template, different levels can be assigned for each database type. For example, the finance database may have four levels: bronze, silver, gold, and platinum. Each of these levels may correspond to increasing features, capacities, security levels, availability levels, and so forth. Similarly, a sales database may be analyzed by the Gateway. The sales database may then be made available for provisioning in the private cloud at bronze and gold levels.

The user interface 400 can load all of the available templates for each database and level available to the customer. When the customer loads the user interface 400, the customer will see database options that are similar to what is already installed and operating on the customer database system. This allows a customer to quickly select a type of database based on its use. For example, a customer who wants to prototype a new finance database would be able to select the finance database at the silver level. The user interface 400 also readily shows the database version required, the operating system required, and the type of database provided by each level. In this example, the user selects the "Finance Gold" database and moves to the next step in the provisioning process.

Figure 5:
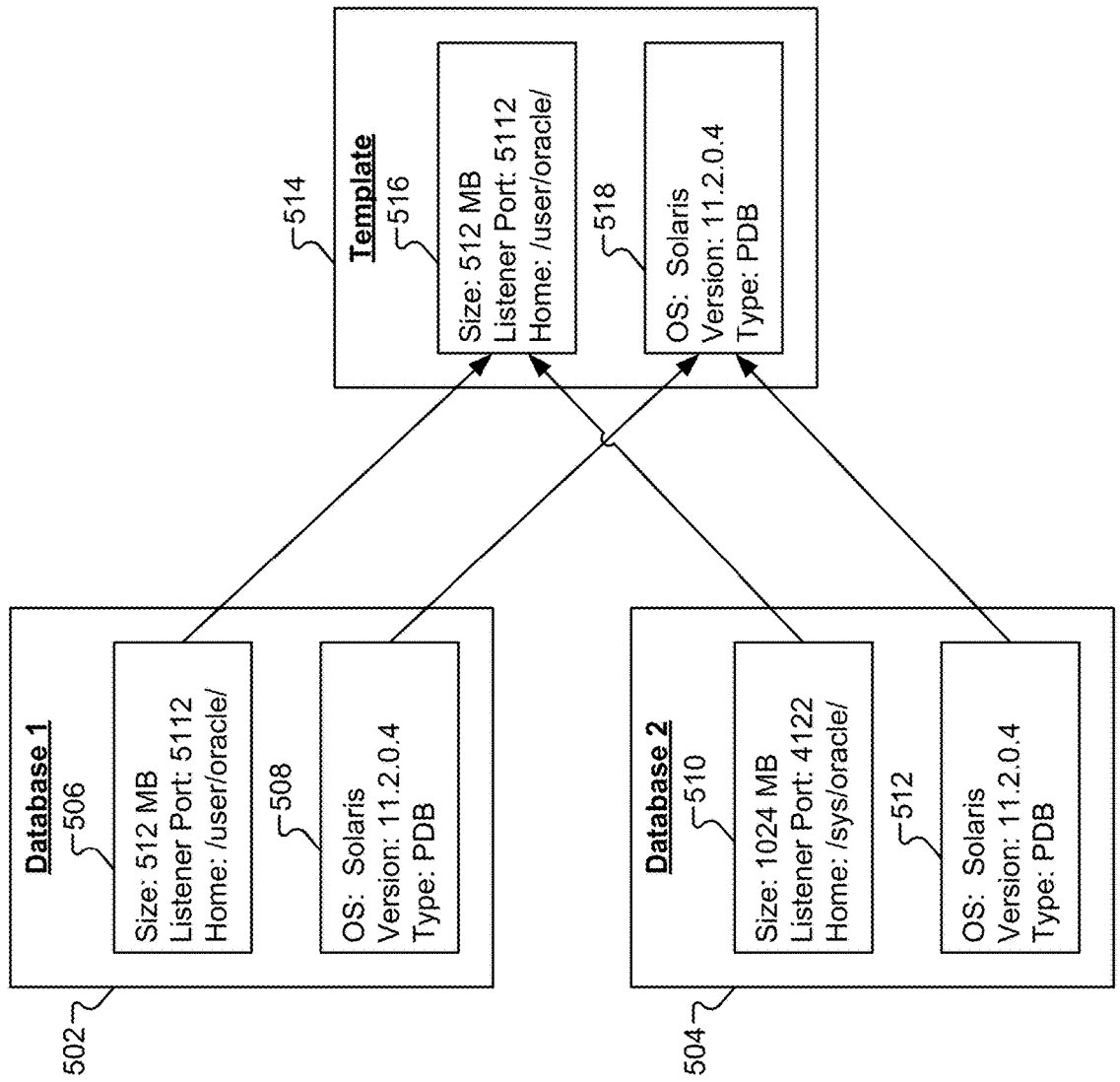
FIG. 5 illustrates a diagram of how the characteristics from a plurality of databases can be combined to form a single database template, according to some embodiments.

FIG. 5 illustrates a diagram of how the characteristics from a plurality of databases can be combined to form a single database template, according to some embodiments. A template may be comprised of a number of different elements. For example, each database can be characterized by the database type, operating system, and/or version (e.g., single instance, RAC, CDB/PDB, schema, 11G, 12C, Linux, Solaris, Windows, etc.). A database may also be characterized by database parameters, such as initialization parameters, whether or not the database has standby, Recovery Manager (RMAN) backups, etc. The database may also be characterized by the compute size, comprising the CPU usage, the memory usage, and the storage requirements.

As the gateway analyzes the customer database system, the tool can create and make available templates based on the database characteristics discovered by the gateway. However, generating templates for every database may yield a template library that becomes very large and complicated, as templates are needed for each source system and for related copies of each source system. Instead of creating a template for every source database, the database characteristics can be divided into at least two groups. The first group may include characteristics that are shared between a number of databases. The second group may include characteristics that are unique to each database. Databases that share characteristics of the first group can be combined into a single template, and the characteristics and the second group can be edited by the customer when the databases provision.

For example, a first database 502 and a second database 504 may be analyzed by the gateway. The first group of characteristics 508 of the first database 502 include an operating system, a database version, and a database type, along with other characteristics that have been omitted for clarity. A first group of characteristics 512 of the second database 504 are the same as the first group of characteristics 508 of the first database 502. However, a second group of characteristics 506 of the first database 502 may be different from a second group of characteristics 510 of the second database 504. Instead of generating two separate templates, a single template 514 can be generated where the first group of characteristics 518 of the template 514 matches that of the first database 502 and the second database 504. The second group of characteristics 516 of the template 514 may include a size of the database, a listener port, and a home directory, along with other variable parameters that have been omitted for clarity. Default values may be chosen for each of the second group of characteristics 516 in the template 514. For example, the second group of characteristics 516 may be copied from either the first database 502 or the second database 504. In other embodiments, more than two databases may be combined to form a single template. In other embodiments, a single database may result in a single template, if that single database does not share characteristics with any other databases in the customer database system.

Figure 6:
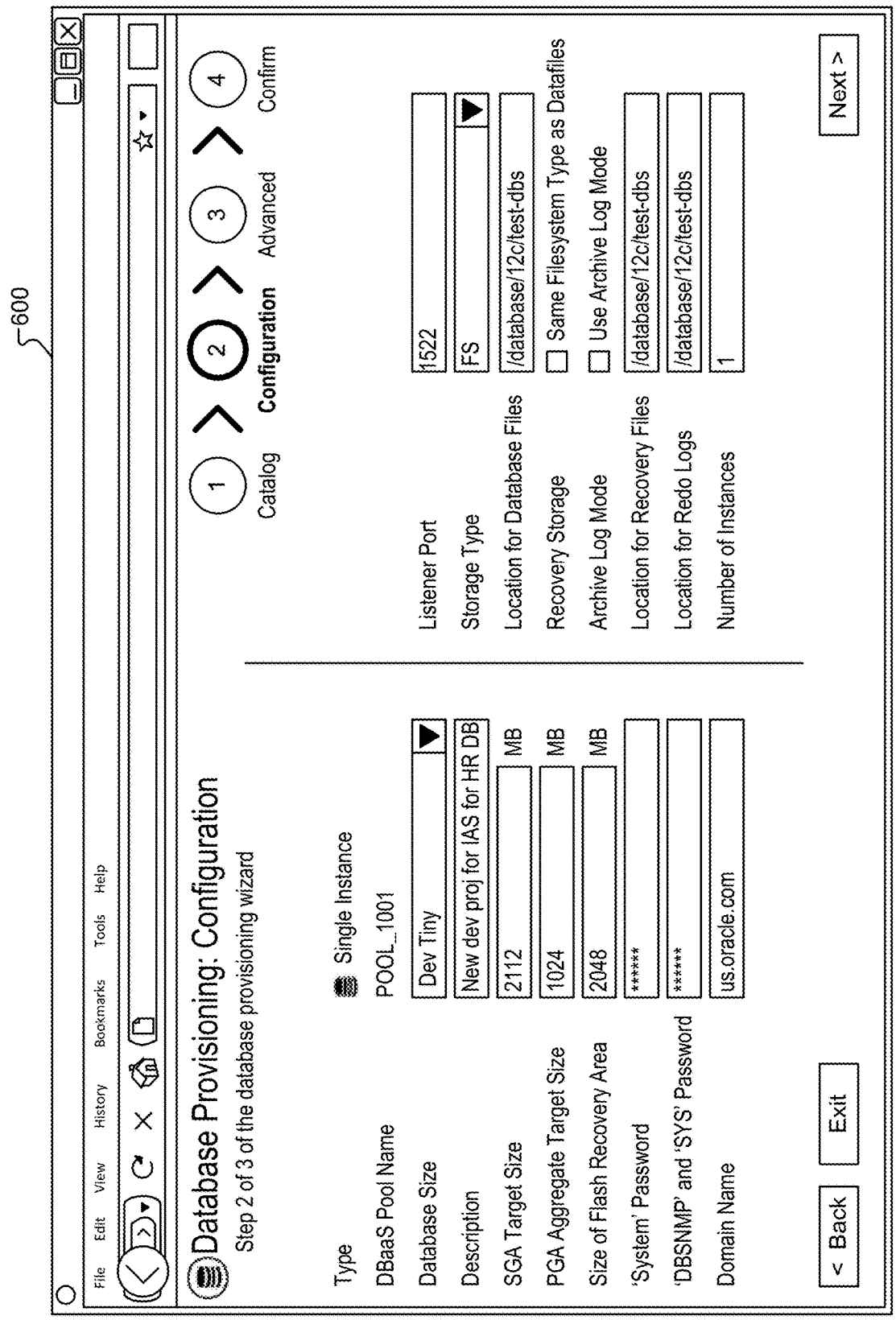
FIG. 6 illustrates a user interface for completing the variable parameters of a selected template, according to some embodiments.

FIG. 6 illustrates a user interface 600 for completing the variable parameters of a selected template, according to some embodiments. When selecting the template, the parameters of the database to be provisioned that are based on the first group of characteristics in the template can be populated with the data values from the template. For the second group of characteristics in the template, the user interface 600 can allow the customer to select values for each of the variable parameters. Each of the parameters in second group of characteristics may be set via user inputs. These parameters include a database size, a database description, a target size, various passwords, domain names, listener ports, storage types, database file locations, recovery options, archive options, recovery file locations, redo log locations, numbers of instances, and so forth. After filling in the variable parameters, the customer can move to the next phase of the provisioning process.

Figure 7:
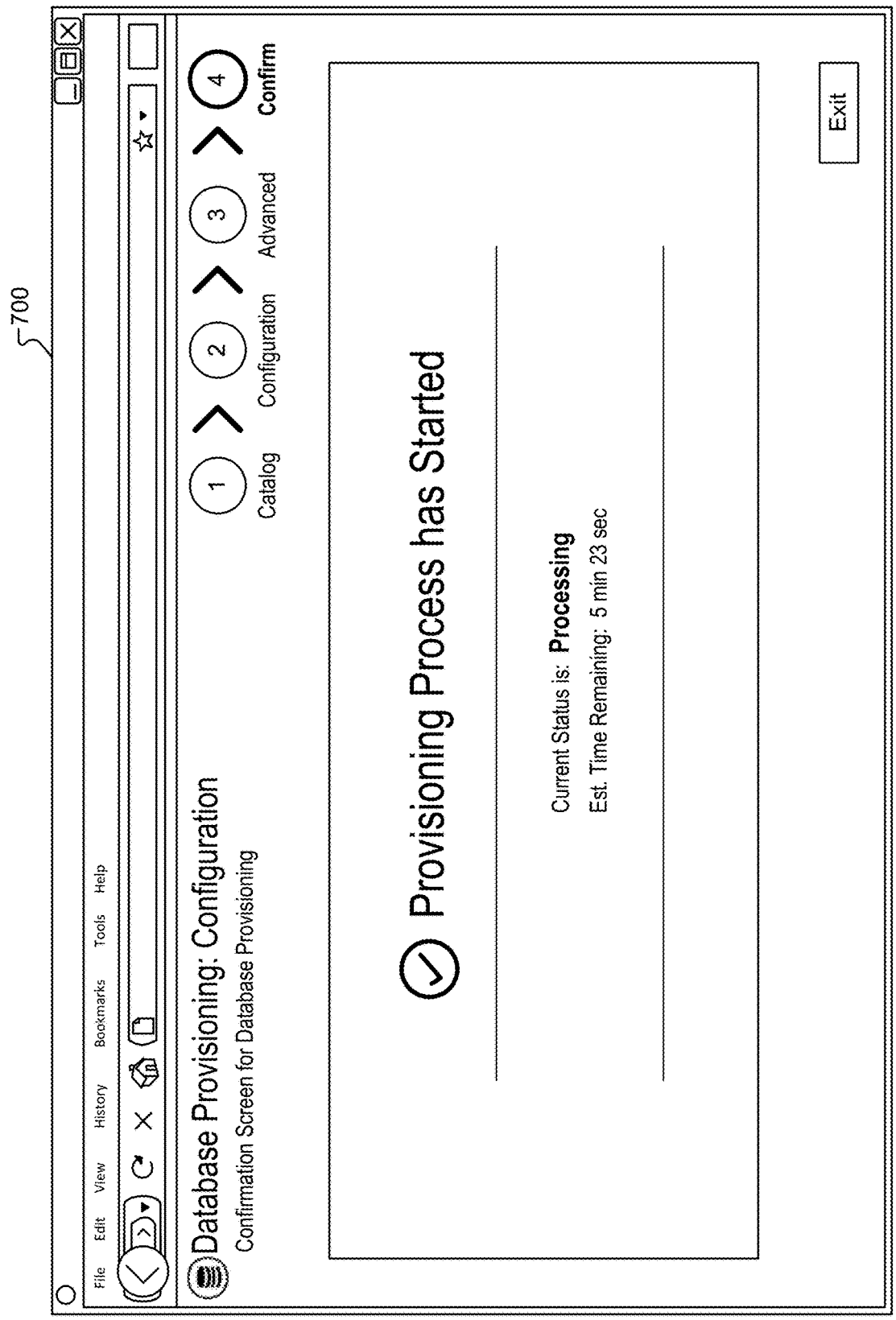
FIG. 7 illustrates a user interface for updating progress during the provisioning process, according to some embodiments.

FIG. 7 illustrates a user interface 700 for updating progress during the provisioning process, according to some embodiments. Prior to this disclosure, a request to provision a database in a private cloud would require weeks or months to accomplish while the private cloud assembled, loaded, and installed the hardware/software required for the new database. Because of the preallocation and testing provided by the embodiments described herein, the provisioning process can be completed within minutes of the completed request from through the user interface 600. User interface 700 receives updates every few seconds from the GET request through the REST API described above and provides an estimated time remaining for the provisioning process to complete.

Figure 8:
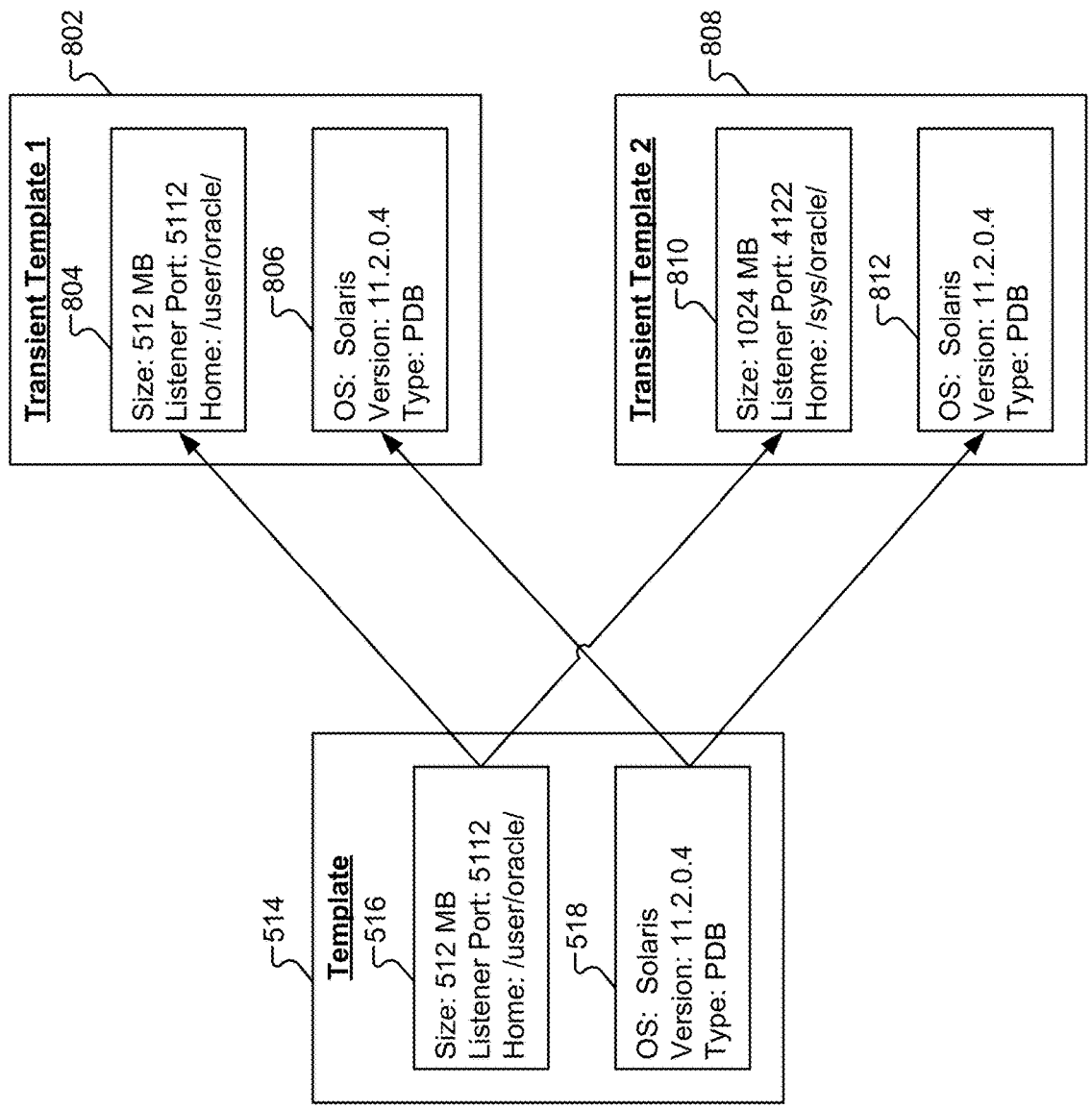
FIG. 8 illustrates transient templates created by the provisioning process, according to some embodiments.

FIG. 8 illustrates transient templates created by the provisioning process, according to some embodiments. When the variable parameters are completed through user interface 600, a new template, referred to herein as a "transient template," will be created to store the variable parameter values provided by the customer. In some embodiments, every provisioning of a new database in the private cloud will result in the creation of a transient template. In some embodiments, a transient template may be created even if all of the parameter values for the new database are the same as the parameter values in the original template selected by the customer. In other embodiments, a transient template will only be created if one or more of the parameter values for the provisioned database are different from the values in the original template.

For example, if the customer selects template 514, and then changes one or more of the variable parameter values, a new transient template 808 will be created to store the variable parameter values. In this example, the second group of characteristics 810 of the new transient template 808 are different from the second group of characteristics 516 of the template 514, including the database size, the listener port, and the home directory. In some embodiments, a new transient template 802 may be created even if the second group of characteristics 804 of the new transient template 802 are the same as the second group of characteristics 516 of the template 514.

Figure 9:
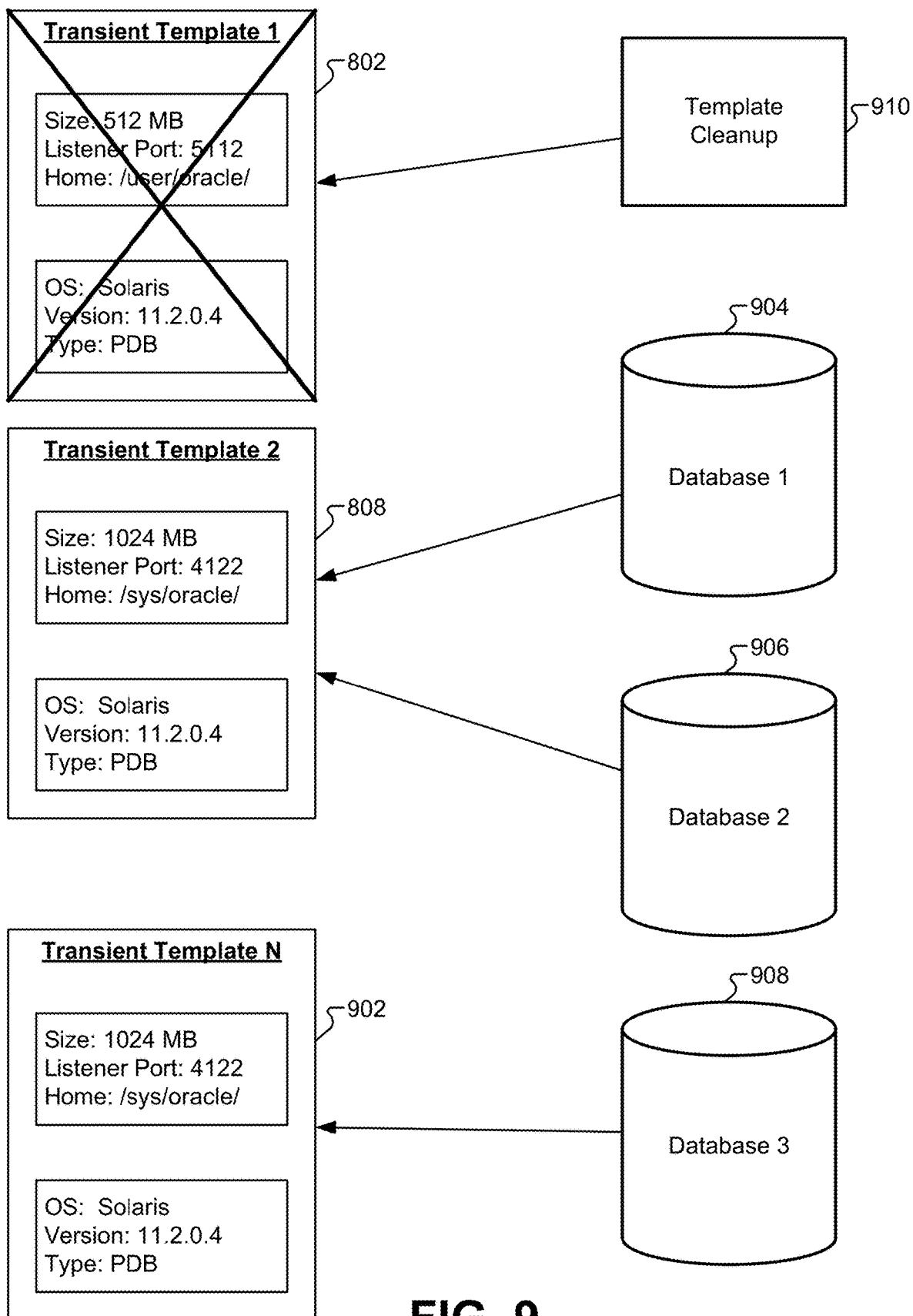
FIG. 9 illustrates how a library including templates and transient templates is managed over time, according to some embodiments.

FIG. 9 illustrates how a library including templates and transient templates is managed over time, according to some embodiments. Each of the transient templates 802, 808, 902 illustrated in FIG. 9 may be the result of provisioned databases in the private cloud as specified by the customer. The library may maintain a list of links to actual databases 904, 906, 908 in the private cloud. A template cleanup process 910 can periodically clean the template library by removing any transient templates that are no longer connected to an active database in the private cloud. For example, transient template 802 may be removed from the template library if the corresponding provisioned database in the private cloud is no longer active. In some embodiments, the cloud support platform can periodically query the private cloud to determine which databases are still active, and then remove any transient templates from the template library that are no longer connected to an active database. In the example of FIG. 9, transient templates 808 and 902 may remain in the template library because they are still connected to active databases in the private cloud.

Figure 10:
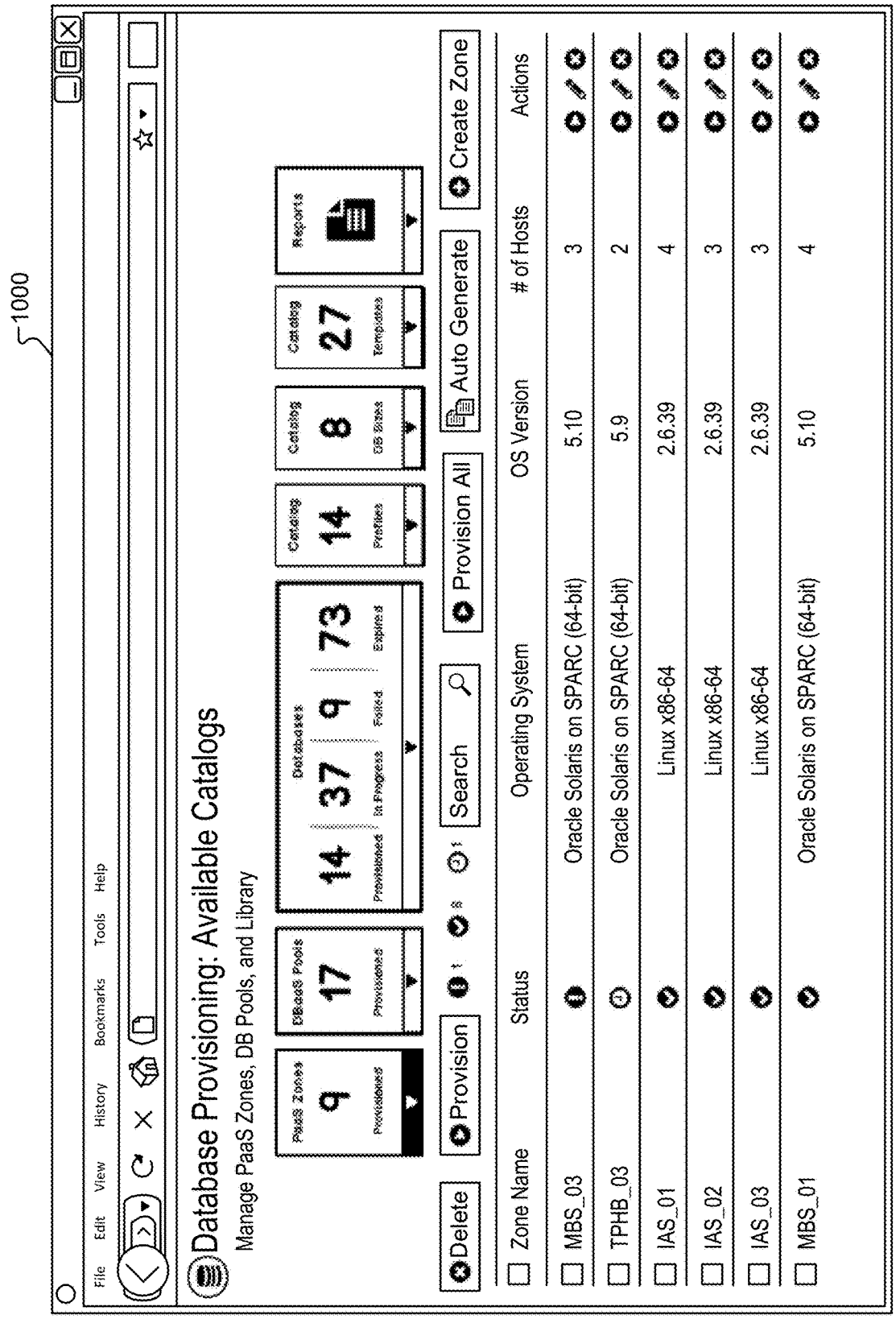
FIG. 10 illustrates a user interface for managing the provisioning of multiple databases, according to some embodiments.

FIG. 10 illustrates a user interface 1000 for managing the provisioning of multiple databases, according to some embodiments. The user interface 1000 provides a summary for the customer of the private cloud and any associated provisioning processes. For example, the user interface 1000 indicates the number of PaaS zones, the number of DBaaS pools, and the number of templates in the library catalog. Additionally, a status for each of the databases provisioned in the private cloud may also be displayed. For example, the user interface 1000 indicates that 14 databases have been successfully provisioned, 37 databases are currently being provisioned, 9 databases failed the provisioning process, and 73 databases were successfully provisioned and since expired.

In addition to providing a summary of the private cloud database provisioning process, the user interface 1000 may also allow the customer to provision a plurality of databases in a batch. User interface 1000 allows the customer to select more than one database at once, and then use the "Provision All" input to send a batch of provisioning requests to the private cloud. Because of the preallocated environments described above, these embodiments enable the migration of multiple databases at once, even in different environments. A feature is available within the gateway to provision all selected databases. For example, a user/administrator can automatically add many hosts into an existing PaaS of the specified type without requiring the user/administrator to repeatedly click each host. This is efficient if the user/administrator wishes to create a very large development pool.

Figure 11:
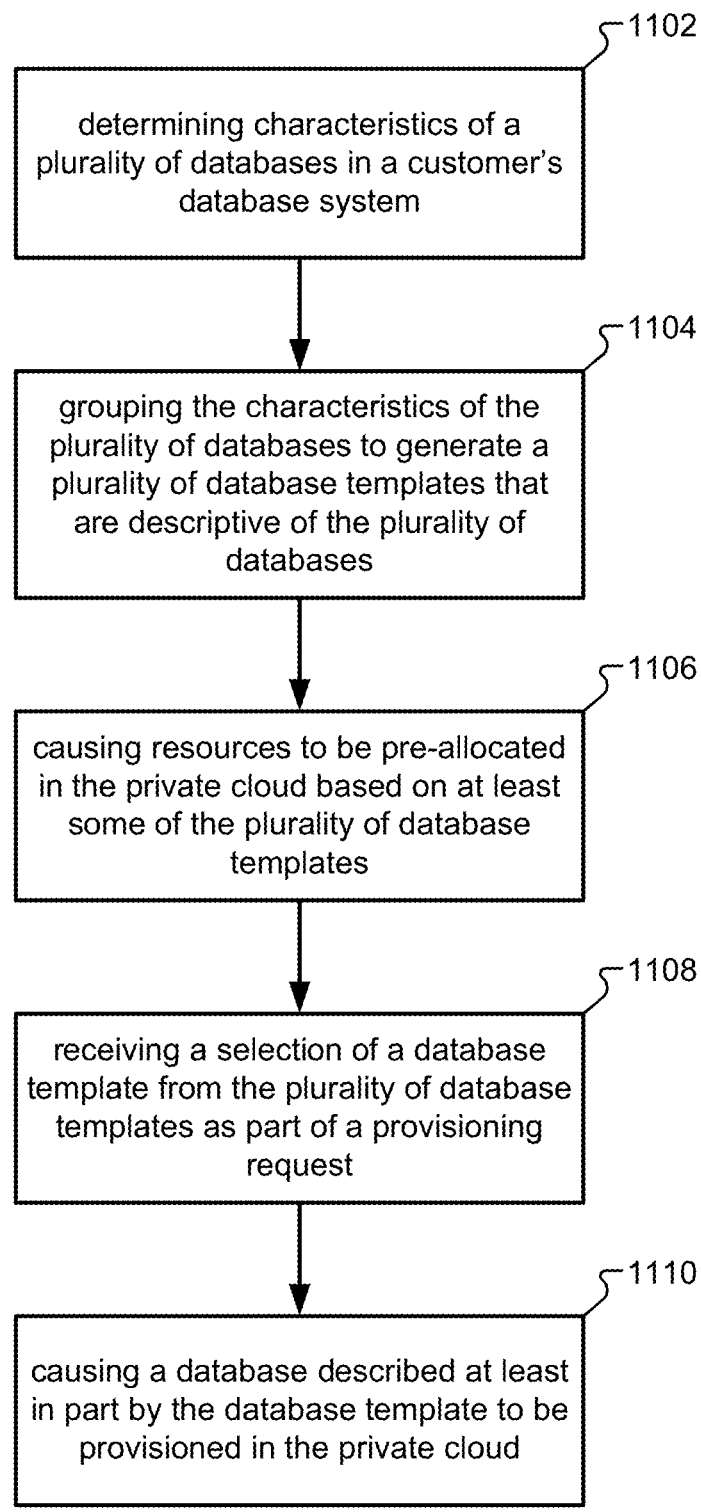
FIG. 11 illustrates a method of pre-allocating resources for database provisioning in a private cloud, according to some embodiments.

FIG. 11 illustrates a method of pre-allocating resources for database provisioning in a private cloud, according to some embodiments. The method may include determining characteristics of a plurality of databases in a customer's database system (1102), and grouping the characteristics of the plurality of databases to generate a plurality of database templates that are descriptive of the plurality of databases (1104). The method may also include causing resources to be pre-allocated in the private cloud based on at least some of the plurality of database templates (1106). The method may additionally include receiving a selection of a database template from the plurality of database templates as part of a provisioning request (1108). The method may further include causing a database described at least in part by the database template to be provisioned in the private cloud (1110).

It should be appreciated that the specific steps illustrated in FIG. 11 provide particular methods of provisioning databases in a private cloud according to various embodiments of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 12:
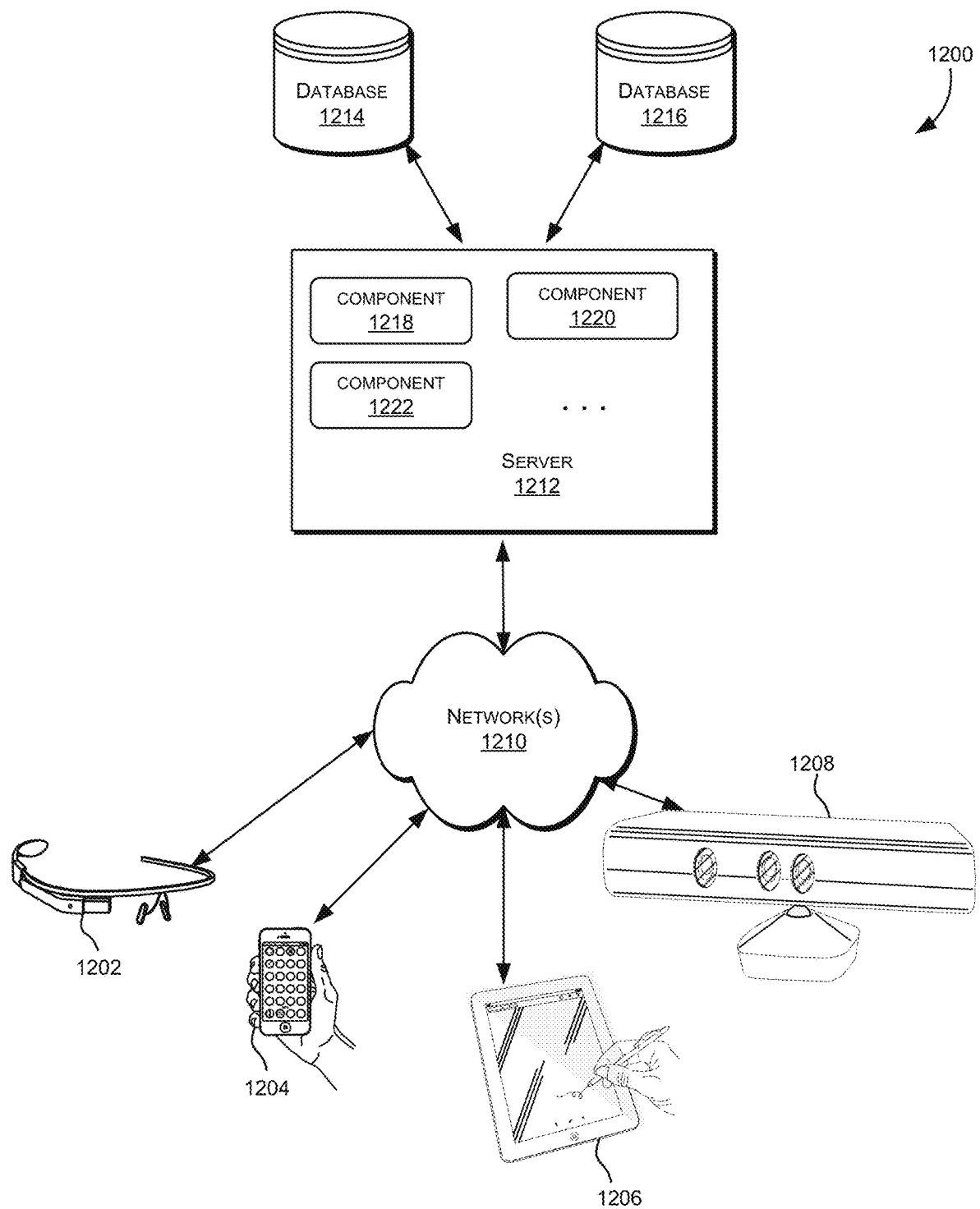
FIG. 12 illustrates a simplified block diagram of a distributed system for implementing some of the embodiments.

FIG. 12 depicts a simplified diagram of a distributed system 1200 for implementing one of the embodiments. In the illustrated embodiment, distributed system 1200 includes one or more client computing devices 1202, 1204, 1206, and 1208, which are configured to execute and operate a client application such as a web browser, proprietary client (e.g., Oracle Forms), or the like over one or more network(s) 1210. Server 1212 may be communicatively coupled with remote client computing devices 1202, 1204, 1206, and 1208 via network 1210.

In various embodiments, server 1212 may be adapted to run one or more services or software applications provided by one or more of the components of the system. In some embodiments, these services may be offered as web-based or cloud services or under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in the figure, the software components 1218, 1220 and 1222 of system 1200 are shown as being implemented on server 1212. In other embodiments, one or more of the components of system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in the figure is thus one example of a distributed system for implementing an embodiment system and is not intended to be limiting.

Client computing devices 1202, 1204, 1206, and/or 1208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1202, 1204, 1206, and 1208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1210.

Although exemplary distributed system 1200 is shown with four client computing devices, any number of client computing devices may be supported. Other devices, such as devices with sensors, etc., may interact with server 1212.

Network(s) 1210 in distributed system 1200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1210 can be a local area network (LAN), such as one based on Ethernet, Token-Ring and/or the like. Network(s) 1210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1212 may be adapted to run one or more services or software applications described in the foregoing disclosure. For example, server 1212 may correspond to a server for performing processing described above according to an embodiment of the present disclosure.

Server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more databases 1214 and 1216. Databases 1214 and 1216 may reside in a variety of locations. By way of example, one or more of databases 1214 and 1216 may reside on a non-transitory storage medium local to (and/or resident in) server 1212. Alternatively, databases 1214 and 1216 may be remote from server 1212 and in communication with server 1212 via a network-based or dedicated connection. In one set of embodiments, databases 1214 and 1216 may reside in a storage-area network (SAN). Similarly, any necessary files for performing the functions attributed to server 1212 may be stored locally on server 1212 and/or remotely, as appropriate. In one set of embodiments, databases 1214 and 1216 may include relational databases, such as databases provided by Oracle, that are adapted to store, update, and retrieve data in response to SQL-formatted commands.

Figure 13:
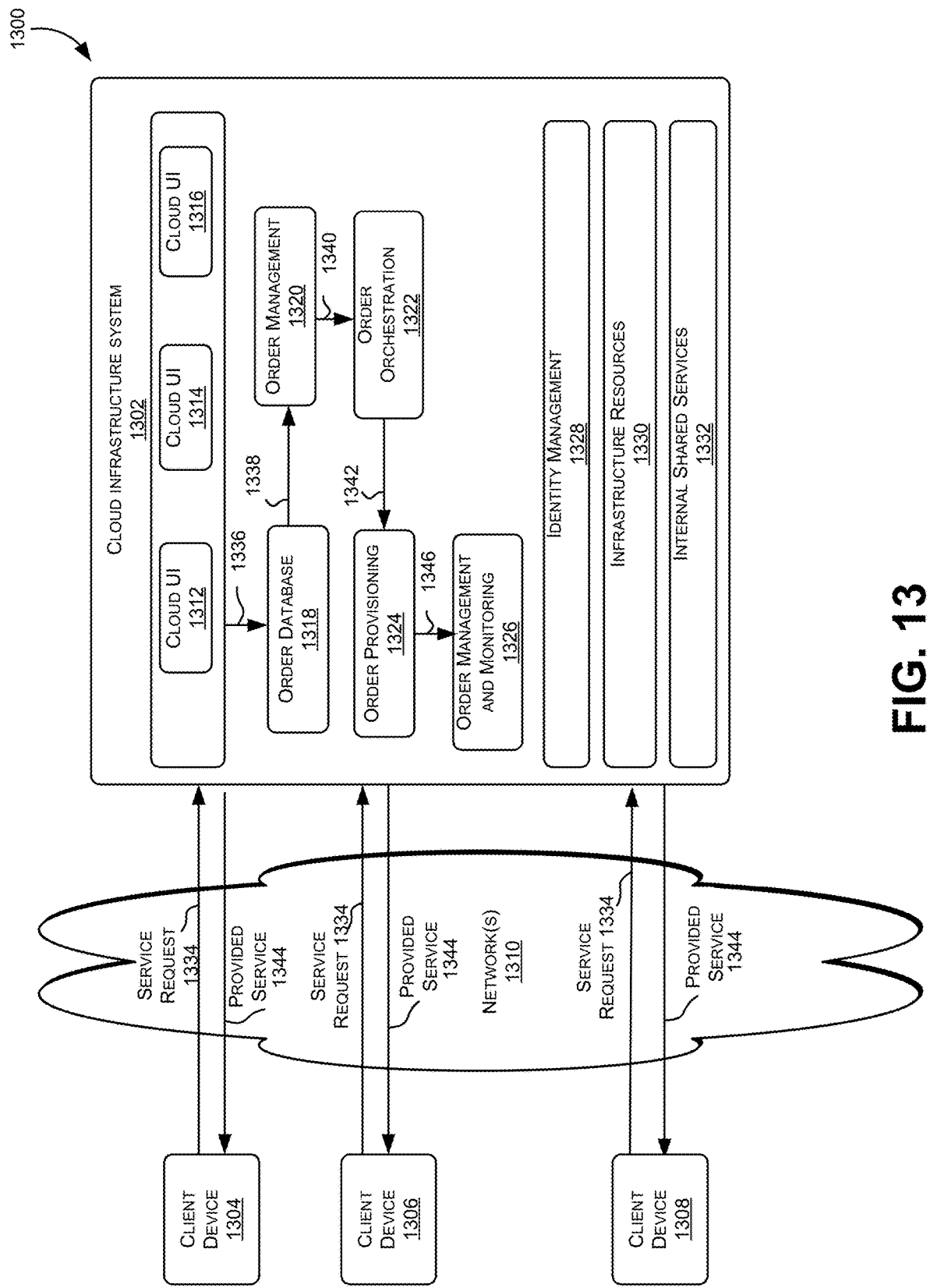
FIG. 13 illustrates a simplified block diagram of components of a system environment by which services provided by the components of an embodiment system may be offered as cloud services.

FIG. 13 is a simplified block diagram of one or more components of a system environment 1300 by which services provided by one or more components of an embodiment system may be offered as cloud services, in accordance with an embodiment of the present disclosure. In the illustrated embodiment, system environment 1300 includes one or more client computing devices 1304, 1306, and 1308 that may be used by users to interact with a cloud infrastructure system 1302 that provides cloud services. The client computing devices may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302.

It should be appreciated that cloud infrastructure system 1302 depicted in the figure may have other components than those depicted. Further, the embodiment shown in the figure is only one example of a cloud infrastructure system that may incorporate an embodiment of the invention. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 1202, 1204, 1206, and 1208.

Although exemplary system environment 1300 is shown with three client computing devices, any number of client computing devices may be supported. Other devices such as devices with sensors, etc. may interact with cloud infrastructure system 1302.

Network(s) 1310 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for network(s) 1210.

Cloud infrastructure system 1302 may comprise one or more computers and/or servers that may include those described above for server 1212.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform.

In some embodiments, resources in cloud infrastructure system 1302 may be shared by multiple users and dynamically re-allocated per demand. Additionally, resources may be allocated to users in different time zones. For example, cloud infrastructure system 1330 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 and by the services provided by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in the figure, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In exemplary operation 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI), cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

After an order has been placed by the customer, the order information is received via the cloud UIs, 1312, 1314 and/or 1316.

At operation 1336, the order is stored in order database 1318. Order database 1318 can be one of several databases operated by cloud infrastructure system 1318 and operated in conjunction with other system elements.

At operation 1338, the order information is forwarded to an order management module 1320. In some instances, order management module 1320 may be configured to perform billing and accounting functions related to the order, such as verifying the order, and upon verification, booking the order.

At operation 1340, information regarding the order is communicated to an order orchestration module 1322. Order orchestration module 1322 may utilize the order information to orchestrate the provisioning of services and resources for the order placed by the customer. In some instances, order orchestration module 1322 may orchestrate the provisioning of resources to support the subscribed services using the services of order provisioning module 1324.

In certain embodiments, order orchestration module 1322 enables the management of business processes associated with each order and applies business logic to determine whether an order should proceed to provisioning. At operation 1342, upon receiving an order for a new subscription, order orchestration module 1322 sends a request to order provisioning module 1324 to allocate resources and configure those resources needed to fulfill the subscription order. Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. Order orchestration module 1322 may thus be isolated from implementation details, such as whether or not services and resources are actually provisioned on the fly or pre-provisioned and only allocated/assigned upon request.

At operation 1344, once the services and resources are provisioned, a notification of the provided service may be sent to customers on client devices 1304, 1306 and/or 1308 by order provisioning module 1324 of cloud infrastructure system 1302.

At operation 1346, the customer's subscription order may be managed and tracked by an order management and monitoring module 1326. In some instances, order management and monitoring module 1326 may be configured to collect usage statistics for the services in the subscription order, such as the amount of storage used, the amount data transferred, the number of users, and the amount of system up time and system down time.

In certain embodiments, cloud infrastructure system 1300 may include an identity management module 1328. Identity management module 1328 may be configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

Figure 14:
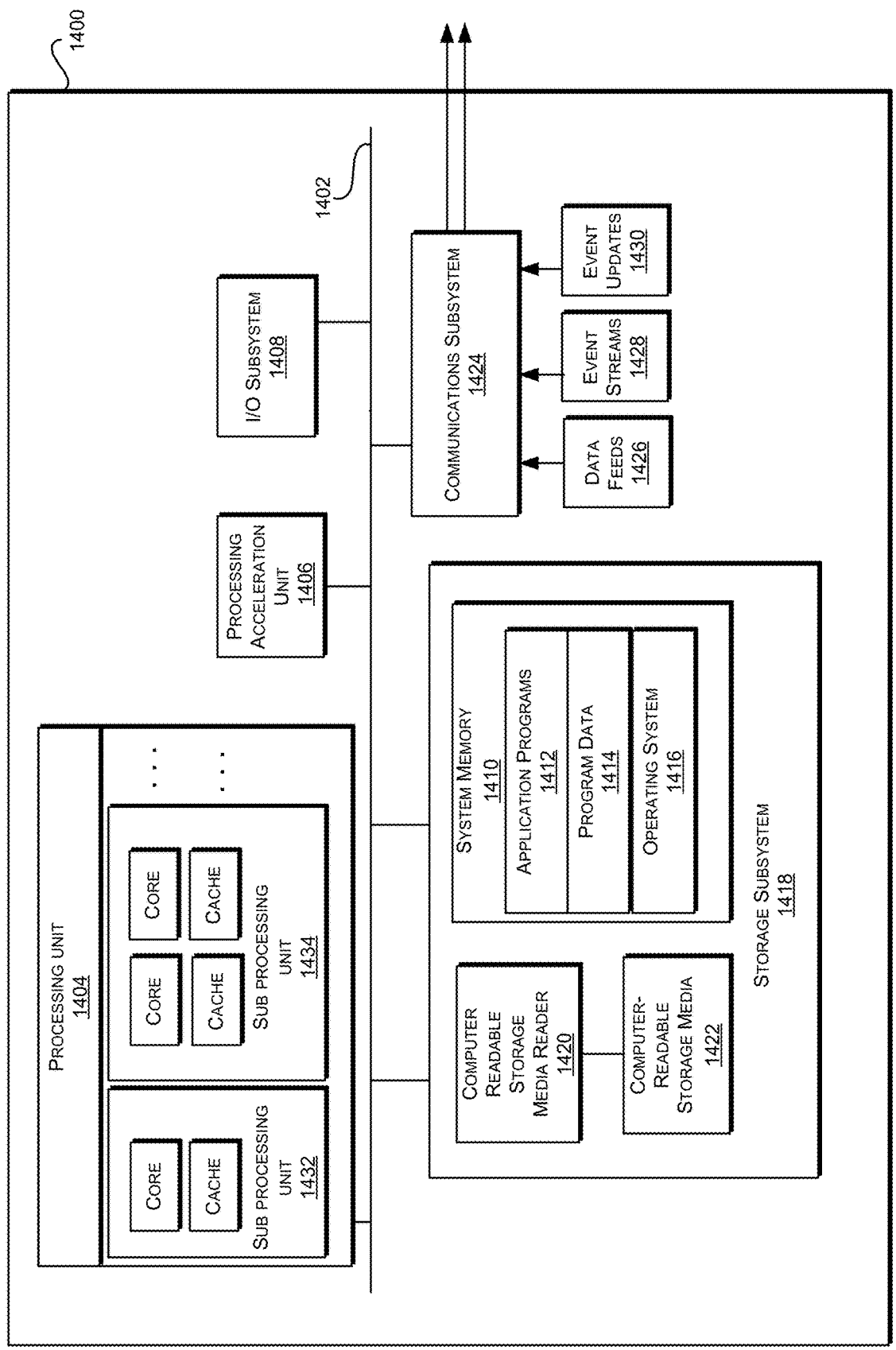
FIG. 14 illustrates an exemplary computer system, in which various embodiments may be implemented.

FIG. 14 illustrates an exemplary computer system 1400, in which various embodiments of the present invention may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present invention.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of pre-allocating resources for database provisioning in a cloud, the method comprising:
   determining characteristics of a plurality of databases operating and provisioned in a customer's database system outside of the cloud that are storing and providing the customer's data;
   grouping the characteristics of the plurality of databases based at least in part on customer usage of the plurality of databases to generate a plurality of database templates specific to the customer's database system that are descriptive of the plurality of databases, wherein a database template in the plurality of database templates comprises one or more variable parameters that are not uniform across a group of the plurality of databases on which the database template is based;
   creating a plurality of service levels that correspond to increasing performance requirements;
   for each of the plurality of service levels, assigning a template from the plurality of templates to the service level that provides a level of performance that matches the performance requirement of the service level;
   causing resources to be pre-allocated in the cloud, including installing database and operating system combinations that are not pre-installed in the cloud based on at least some of the plurality of database templates prior to receiving a provisioning request from the customer's database system;
   receiving the provisioning request comprising a selection of a first service level in the plurality of service levels, wherein the plurality of service levels are provided as available options for the provisioning request;
   determining that the database template is assigned to the first service level;
   receiving values with the provisioning request for the one or more variable parameters of the database template to complete the database template; and
   causing a database described at least in part by the database template to be provisioned in the cloud using at least one of the database and operating system combinations that were pre-installed prior to receiving the provisioning request.

2. The method of claim 1, wherein the characteristics of the plurality of databases comprise an operating system type and version.

3. The method of claim 1, wherein the characteristics of the plurality of databases comprise a database type and version.

4. The method of claim 1, wherein the characteristics of the plurality of databases comprise a database memory size.

5. The method of claim 1, wherein the characteristics of the plurality of databases comprise processor usage.

6. The method of claim 1, wherein the characteristics of the plurality of databases are determined by one or more software agents installed on the customer's database system that transmit the characteristics through a gateway to a cloud support platform.

7. The method of claim 6, wherein the cloud support platform generates real-time reports of the characteristics of the plurality of databases.

8. A non-transitory, computer-readable medium comprising instructions that, when executed by one or more processors, cause the one or more processors to perform operations comprising:
   determining characteristics of a plurality of databases operating and provisioned in a customer's database system outside of a cloud that are storing and providing the customer's data;
   grouping the characteristics of the plurality of databases based at least in part on customer usage of the plurality of databases to generate a plurality of database templates specific to the customer's database system that are descriptive of the plurality of databases, wherein a database template in the plurality of database templates comprises one or more variable parameters that are not uniform across a group of the plurality of databases on which the database template is based;
   creating a plurality of service levels that correspond to increasing performance requirements;
   for each of the plurality of service levels, assigning a template from the plurality of templates to the service level that provides a level of performance that matches the performance requirement of the service level;
   causing resources to be pre-allocated in the cloud, including installing database and operating system combinations that are not pre-installed in the cloud based on at least some of the plurality of database templates prior to receiving a provisioning request from the customer's database system;
   receiving the provisioning request comprising a selection of a first service level in the plurality of service levels, wherein the plurality of service levels are provided as available options for the provisioning request;
   determining that the database template is assigned to the first service level;
   receiving values with the provisioning request for the one or more variable parameters of the database template to complete the database template; and
   causing a database described at least in part by the database template to be provisioned in the cloud using at least one of the database and operating system combinations that were pre-installed prior to receiving the provisioning request.

9. The non-transitory, computer-readable medium of claim 8 wherein grouping the characteristics of the plurality of databases to generate the plurality of database templates comprises:
   dividing the characteristics into at least a first group of characteristics and a second group of characteristics, wherein:

the first group of characteristics comprises characteristics that are shared between two or more of the plurality of databases; and the second group of characteristics comprises characteristics that are unique to at least one of the two or more of the plurality of databases.

10. The non-transitory, computer-readable medium of claim 9 wherein the first group of characteristics comprises an operating system, a database version number, and a database type.

11. The non-transitory, computer-readable medium of claim 9 wherein the second group of characteristics comprises a database memory size, a listener port, and a home directory path.

12. The non-transitory, computer-readable medium of claim 9, comprising additional instructions that cause the one or more processors to perform additional operations comprising:

creating, after receiving the selection of the database template, a transient template that includes the first group of characteristics from the database template;

receiving input comprising values for the second group of characteristics; and assigning the values for the second group of characteristics to the transient template.

13. The non-transitory, computer-readable medium of claim 12, comprising additional instructions that cause the one or more processors to perform additional operations comprising:

maintaining the transient template in a library of templates while the database described at least in part by the database template is active in the cloud; and deleting the transient template from the library of templates after the database described at least in part by the database template is no longer active in the cloud.

14. The non-transitory, computer-readable medium according to claim 13, comprising additional instructions that cause the one or more processors to perform additional operations comprising:

querying, by a cloud support platform, the cloud to determine when the database described at least in part by the database template is no longer active in the cloud.

15. A system comprising:

one or more hardware processors; and one or more hardware memory devices comprising instructions that, when executed by the one or more processors, cause the one or more processors to perform operations comprising:

determining characteristics of a plurality of databases operating and provisioned in a customer's database system outside of a cloud that are storing and providing the customer's data;

grouping the characteristics of the plurality of databases based at least in part on customer usage of the plurality of databases to generate a plurality of database templates specific to the customer's database system that are descriptive of the plurality of databases, wherein a database template in the plurality of database templates comprises one or more variable parameters that are not uniform across a group of the plurality of databases on which the database template is based;

creating a plurality of service levels that correspond to increasing performance requirements;

for each of the plurality of service levels, assigning a template from the plurality of templates to the service level that provides a level of performance that matches the performance requirement of the service level;

causing resources to be pre-allocated in the cloud, including: installing database and operating system combinations that are not pre-installed in the cloud based on at least some of the plurality of database templates prior to receiving a provisioning request from the customer's database system;

receiving the provisioning request comprising a selection of a first service level in the plurality of service levels, wherein the plurality of service levels are provided as available options for the provisioning request;

determining that the database template is assigned to the first service level;

receiving values with the provisioning request for the one or more variable parameters of the database template to complete the database template; and causing a database described at least in part by the database template to be provisioned in the cloud using at least one of the database and operating system combinations that were pre-installed prior to receiving the provisioning request.

16. The system of claim 15, wherein the one or more memory devices further comprises additional instructions that cause the one or more processors to perform additional operations comprising:

receiving an additional selection of an additional database template from the plurality of database templates as part of the provisioning request;

receiving input indicating that the database described at least in part by the database template and an additional database described at least in part by the additional database template should be provisioned together as part of the provisioning request; and causing the additional database described at least in part by the additional database template to be provisioned in the cloud with the database described at least in part by the database template.

17. The system of claim 15 wherein, the cloud comprises:

a first Platform as a Service (PaaS) pool using a first operating system; and a second PaaS pool using a second operating system, wherein the first operating system is different from the second operating system.

18. The system of claim 17 wherein, the first PaaS pool comprises:

a first Database as a Service (DBaaS) pool using a first database version; and a second DBaaS pool using a second database version, wherein the first database version is different from the second database version.

19. The system of claim 15, wherein the one or more memory devices further comprises additional instructions that cause the one or more processors to perform additional operations comprising:

testing the cloud to determine whether the database described at least in part by the database template can be installed in a DBaaS pool that matches specifications in the database template.

20. The system of claim 19, wherein testing the cloud comprises determining whether the cloud comprises a DBaaS pool with an operating system, database version, and database type that matches the database template, and whether the cloud has sufficient memory and processing power to accommodate the database described at least in part by the database template.

* * * * *